（12）United States Patent
Horinouchi et al.

(10) Patent No.: US 11,962,142 B2
(45) Date of Patent: Apr. 16, 2024

(54) POWER DISTRIBUTION SYSTEM FOR MOVING BODY

(71) Applicant: Mitsubishi Electric Corporation, Tokyo (JP)

(72) Inventors: Katsuhiko Horinouchi, Tokyo (JP); Katsuki Hotta, Tokyo (JP); Tsuguhiro Takuno, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 105 days.

(21) Appl. No.: 17/790,138

(22) PCT Filed: Apr. 16, 2020

(86) PCT No.: PCT/JP2020/016708
§ 371 (c)(1),
(2) Date: Jun. 30, 2022

(87) PCT Pub. No.: WO2021/210124
PCT Pub. Date: Oct. 21, 2021

(65) Prior Publication Data
US 2023/0030964 A1 Feb. 2, 2023

(51) Int. Cl.
*H02H 3/10* (2006.01)
*B60R 16/03* (2006.01)
*H02H 9/02* (2006.01)

(52) U.S. Cl.
CPC ............ *H02H 3/105* (2013.01); *B60R 16/03* (2013.01); *H02H 9/02* (2013.01); *H02J 2207/20* (2020.01)

(58) Field of Classification Search
CPC .. H02H 3/30; H02H 3/105; H02H 9/02; H02J 2207/20; B60R 16/03
See application file for complete search history.

(56) References Cited

U.S. PATENT DOCUMENTS

| 4,236,186 A | 11/1980 | Takagi |
| 5,206,801 A | 4/1993 | Flick et al. |
| 2015/0123622 A1 | 5/2015 | Yasui |
| 2017/0234921 A1 | 8/2017 | Handy |

(Continued)

FOREIGN PATENT DOCUMENTS

| JP | 5-78146 U | 10/1993 |
| JP | 6-502985 A | 3/1994 |
| JP | 2011-78239 A | 4/2011 |

(Continued)

OTHER PUBLICATIONS

Extended European Search Report dated May 8, 2023 in corresponding European Patent Application No. EP20931638.9, 8 pages.

(Continued)

*Primary Examiner* — Robert L Deberadinis
(74) *Attorney, Agent, or Firm* — XSENSUS LLP

(57) ABSTRACT

The present disclosure includes: a power generator; and a power line through which power generated by the power generator is transmitted to a load. The power line between the power generator and the load is provided with: a current limitation device configured to, when detecting occurrence of a fault current, limit the fault current; and a current interruption device configured to interrupt current heading for the load, in conjunction with the limitation of the fault current performed by the current limitation device.

20 Claims, 21 Drawing Sheets

(56) References Cited

U.S. PATENT DOCUMENTS

2018/0362181 A1  12/2018  Iwashima et al.
2021/0265831 A1  8/2021  Horinouchi et al.

FOREIGN PATENT DOCUMENTS

| JP | 2015-112002 A | 6/2015 |
| JP | 2016178759 A | 10/2016 |
| JP | 2017-5944 A | 1/2017 |
| JP | 2017-532536 A | 11/2017 |
| JP | 6497488 B1 | 4/2019 |
| WO | 2018/036214 A1 | 3/2018 |

OTHER PUBLICATIONS

International Search Report and Written Opinion dated May 23, 2020, received for PCT Application PCT/JP2020/016708, filed on Apr. 16, 2020, 9 pages including English Translation.

AT TIME OF CURRENT LIMITATION

AT TIME OF CURRENT TRANSFERENCE TO SEMICONDUCTOR SWITCH

AT TIME OF NORMAL CURRENT CONDUCTION

POWER DISTRIBUTION SYSTEM FOR MOVING BODY

CROSS-REFERENCE TO RELATED APPLICATION

The present application is based on PCT filing PCT/JP2020/016708, filed Apr. 16, 2020, the entire contents of which are incorporated herein by reference.

TECHNICAL FIELD

The present disclosure relates to a power distribution system for a moving body.

BACKGROUND ART

Conventionally, moving bodies that obtain propulsion force from motors by driving the motors with use of power generated by power generators such as turbine engine power generators, have been present. Examples of the moving bodies include a motorized aircraft that obtains propulsion force from fans attached to motors. Such an aircraft has a power distribution system that supplies power to the motors inside a body thereof. The power distribution system is provided with a circuit breaker or an opening/closing device such as an electromagnetic contactor for interrupting a fault current or an overcurrent that has a magnitude greater than the magnitude of conduction current and that flows when a fault such as a short circuit or a ground fault occurs.

Since the moving body is required to have a reduced weight, power distribution devices such as the circuit breaker and the opening/closing device also need to be light-weight. Further, reduction of insulation performance or reduction of interruption performance due to reduction in the atmospheric pressure also needs to be taken into account for flights at high altitudes.

The entire power distribution system is required not only to be light-weight and compact but also to minimize influence on travel. Thus, the entire power distribution system needs to maintain a high level of stability. Therefore, the entire power distribution system is required not to experience disturbance even when, for example, a fault such as sudden short circuit occurs during travel.

Meanwhile, conventionally, there has been a technology relating to an electrical system such as an aircraft power distribution system, in which the position of an electrical fault on a transmission line of an electric circuit is specified (see the following Patent Document 1).

CITATION LIST

Patent Document

Patent Document 1: Japanese Laid-Open Patent Publication (translation of PCT application) No. 2017-532536

SUMMARY OF THE INVENTION

Problems to be Solved by the Invention

As described above, the power distribution system for a moving body needs to be light-weight and compact, and maintain a high level of stability. Further, the entire power distribution system is required not to experience disturbance due to rapid disconnection of a load even when, for example, a sudden short circuit or the like occurs during travel. In particular, rapid disconnection of a load leads to unbalance between the amount of power generated by a power generator and the amount of load-consumed power. Consequently, power is excessively generated, whereby excessive burden might be inflicted on the power generator or an engine. Thus, the burden needs to be mitigated.

Meanwhile, the aforementioned Patent Document 1 discloses: including a main switch implemented by a semiconductor switch, and a Transorb provided in parallel to the main switch; and a function of preventing fracture of the main switch by limiting, by the Transorb, overvoltage that is transitionally caused when the main switch is turned off. However, the Transorb does not have a function of conducting current while limiting current. Thus, the combination between the main switch and the Transorb leads to interruption of current heading for a load. Therefore, the interruption of the current leads to electrical disconnection of the load, resulting in unbalance between power generated by a power generator and load-consumed power. Consequently, excessive burden might be inflicted on the power generator.

The present disclosure has been made to solve the above problem, and an object of the present disclosure is to provide a power distribution system for a moving body, the power distribution system preventing occurrence of disturbance in the entire system even if a fault current occurs between a power generator and a load.

Solution to the Problems

A power distribution system for a moving body according to the present disclosure includes:
a power generator; and
a power line through which power generated by the power generator is transmitted to a load, wherein
the power line between the power generator and the load is provided with
  a current limitation device configured to, when detecting occurrence of a fault current, limit the fault current, and
  a current interruption device configured to interrupt current heading for the load, in conjunction with the limitation of the fault current performed by the current limitation device.

Effect of the Invention

The power distribution system for a moving body according to the present disclosure can prevent occurrence of disturbance in the entire system even if a fault current occurs between the power generator and the load.

DESCRIPTION OF EMBODIMENTS

The present disclosure relates to a power distribution system for a motorized moving body such as an aircraft, a ship, a train, or an automobile. The present disclosure particularly relates to a power distribution system for a moving body, the power distribution system stabilizing an operation of the entire system while protecting equipment on a load side when a fault current such as short circuit current or ground fault current is interrupted by a current interruption device at the time of occurrence of a fault such as short circuit or ground fault.

In the embodiments described below, description will be given while a motorized-aircraft power distribution system used for a motorized aircraft (particularly for a medium-sized motorized aircraft or a large-sized motorized aircraft) is presented as an example. Although the following embodiments will be described while an aircraft is presented as an example of the moving body, the present disclosure can be applied in the same manner also to a ship, a train, an automobile, and the like having similar power distribution systems and can obtain the same advantageous effects.

Embodiment 1

Figure 1:
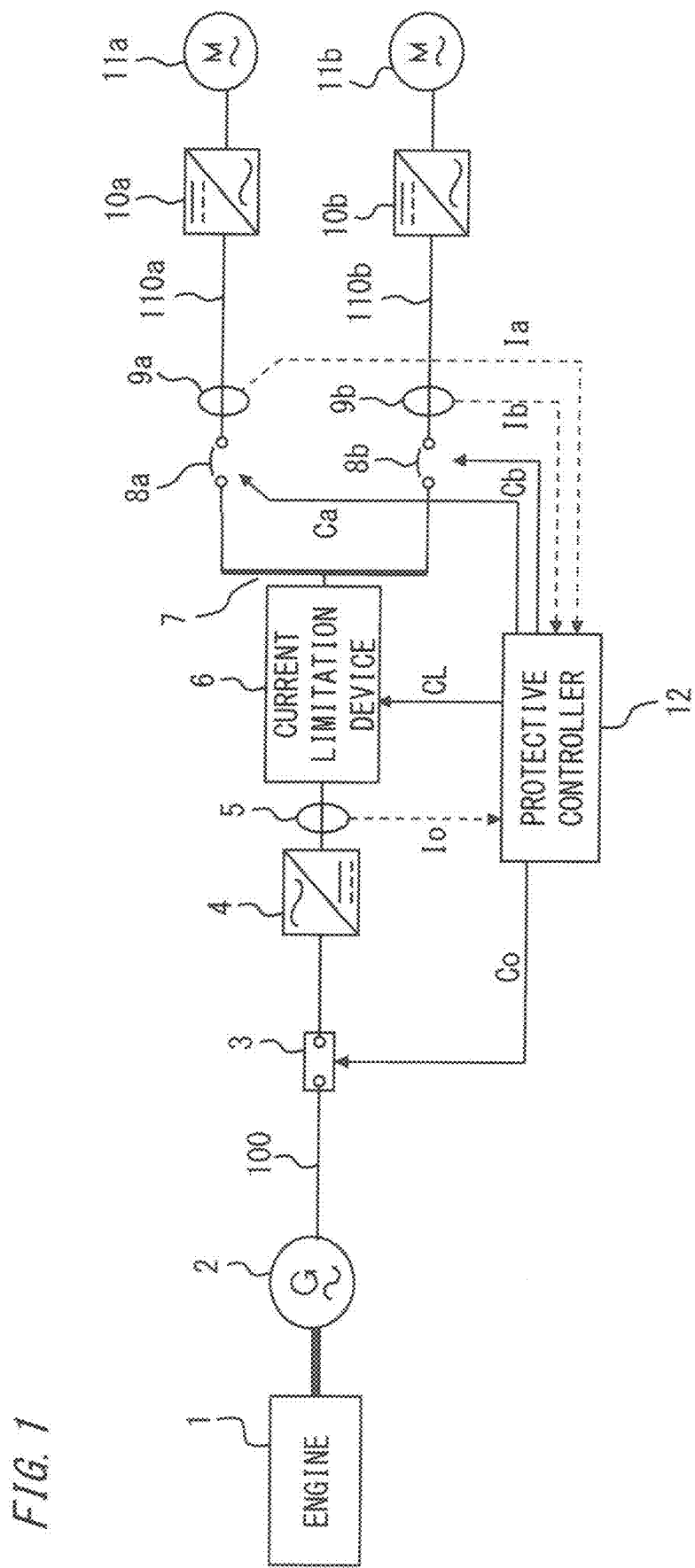
FIG. 1 illustrates an example of the configuration of a power distribution system for a moving body according to embodiment 1.

FIG. 1 illustrates an example of the configuration of the power distribution system for a moving body according to embodiment 1.

As shown in FIG. 1, the present embodiment includes: an engine 1 such as a turbine engine; a power generator 2, such as an AC power generator, which is driven by the engine 1 and generates power; a main line 100 connected to the power generator 2; an AC circuit breaker 3 provided on the main line 100; an AC/DC converter 4 which converts alternating current into direct current; a current limitation device 6; a busbar 7 through which power is distributed from the main line 100 to load lines 110a and 110b; opening/closing devices 8a and 8b which perform switching between ON and OFF for currents in the load lines 110a and 110b; DC/AC converters 10a and 10b which convert direct currents into alternating currents; propulsion motors 11a and 11b as loads which are connected to the load lines 110a and 110b and which obtain propulsion forces by rotating fans; current detectors (current transformers (CT)) 5, 9a, and 9b which output current detection values Io, Ia, and Ib detected on the main line 100 and the load lines 110a and 110b; and a protective controller 12 which detects a fault such as short circuit or ground fault, and then transmits an operation command CL to the current limitation device 6 and transmits opening/closing commands Co, Ca, and Cb to the AC circuit breaker 3 and the opening/closing devices 8a and 8b as current interruption devices.

In FIG. 1, the main line 100, the busbar 7, and the load lines 110a and 110b as power lines are each drawn as a single line. However, in actuality, an AC portion is composed of a plurality of phases of lines and ordinarily composed of three phases of lines, i.e., three lines. That is, the lines in the AC portion in FIG. 1 are drawn as a single line instead of being drawn as three lines. Regarding lines in a DC portion, there are: a case where the DC portion is composed of two lines which are a positive-electrode line and a negative-electrode line or three lines which are a ground line in addition to the two lines; and a case where the DC portion is composed of two lines which are a positive-electrode line and a ground line or two lines which are a negative-electrode line and a ground line. These lines are drawn as a single line. The airframe of the aircraft or the like sometimes serves also as the ground line.

In the present embodiment, description will be given while representatively presenting a case where: the lines of the AC portion are of a three-phase circuit and are three lines; and the lines of the DC portion are two lines which are a positive-electrode line and a negative-electrode line, with the airframe serving also as a ground line. In the following descriptions, regarding the terms "higher-order side" and "lower-order side" on the power lines, the "higher-order side" refers to the power generator side and the "lower-order side" refers to the motor side (load side).

In FIG. 1, the two propulsion motors 11a and 11b as loads are illustrated. However, the number of the propulsion motors may be one, and three or more propulsion motors may be in parallel to one another. The power generator 2 is a synchronous power generator or the like, and the power generation capacity thereof takes a value that is, for example, 1 MW or may be larger than 1 MW and be 30 MW. The voltage of a power grid is 1000 V or higher, and, for example, the voltage of the DC portion may be 1500 V or 3000 V. The capacity of each of the propulsion motors 11a and 11b may be, for example, 300 kW or 1 MW.

Figure 2:
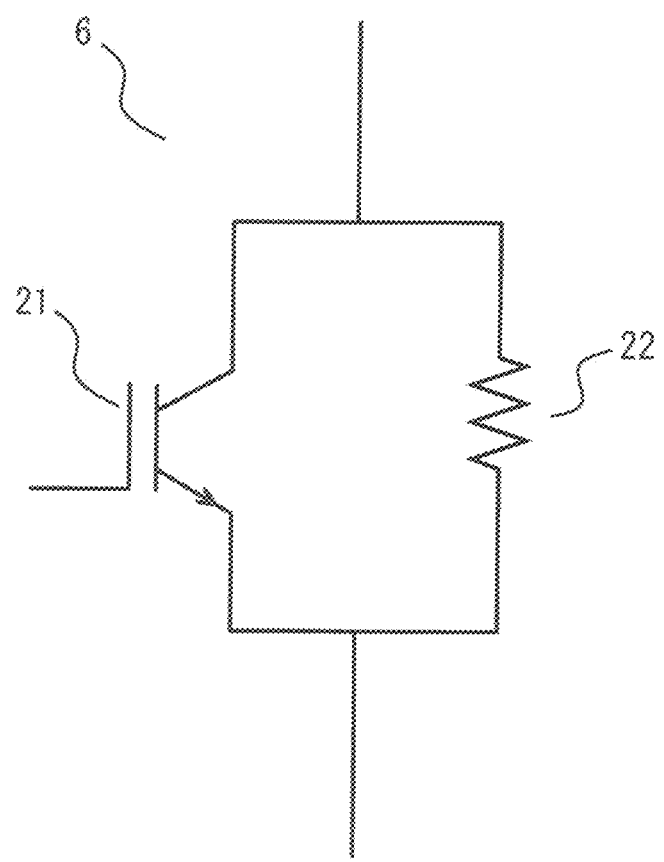
FIG. 2 illustrates an example of the configuration of a current limitation device of the power distribution system for a moving body according to embodiment 1.

FIG. 2 illustrates an example of the configuration of the current limitation device of the power distribution system for a moving body according to embodiment 1.

In FIG. 2, the current limitation device 6 is formed by connecting a semiconductor switch 21 such as an insulated gate bipolar transistor (IGBT) or a semiconductor switch made of silicon carbide (SiC), and a current limitation element 22 in parallel. The current limitation element 22 is, for example, a resistor. An arrester may be used instead of a resistor. In a normal case, the current limitation device 6 turns on the semiconductor switch 21, to conduct current through the semiconductor switch 21. In a case where a fault such as short circuit or ground fault occurs and the current limitation function of the current limitation device 6 is activated, the current limitation device 6 turns off the semiconductor switch 21. Consequently, current is transferred from the semiconductor switch 21 to the current limitation element 22, whereby the amount of current that flows through each power line is limited. It is noted that two or more semiconductor switches 21 may be provided in parallel. The current limitation device 6 in FIG. 2 is provided on each of a positive-electrode line and a negative-electrode line of a DC circuit so as to be located on the lower-order side relative to the AC/DC converter 4 in FIG. 1.

The current limitation device 6 is formed by using a hermetic semiconductor switch 21 or the like such that the insulation performance and the current limitation performance of the current limitation device 6 are not influenced even under an atmospheric pressure at a high altitude lower than the atmospheric pressure on the ground.

Next, an operation performed when a fault such as sudden short circuit occurs on a load line will be described with reference to FIG. 3.

Figure 3:
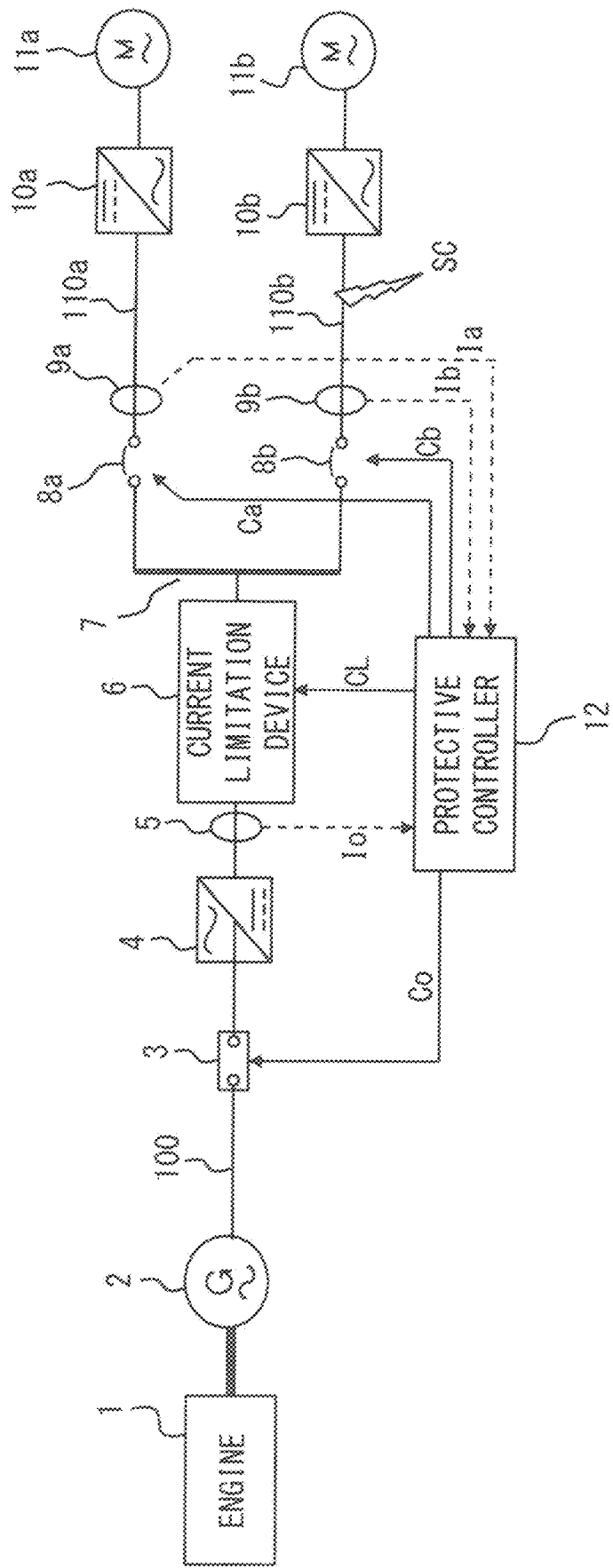
FIG. 3 illustrates an example in which a fault occurs in the power distribution system for a moving body according to embodiment 1.

As shown in FIG. 3, a short circuit is assumed to have occurred on one of the load lines 110a and 110b (here, the load line 110b). It is noted that "SC" in FIG. 3 indicates the position at which the short circuit has occurred. When a short circuit current starts to flow through the load line 110b, the protective controller 12 performs determination as to occurrence of a fault due to short circuit on the basis of the magnitude of a current detection value Ib transmitted from the current detector 9b to the protective controller 12. If the protective controller 12 determines that a fault has occurred, the protective controller 12 transmits an operation command CL to the current limitation device 6 first. When the current limitation device 6 receives the operation command CL, the semiconductor switch 21 of the current limitation device 6 is turned off. Consequently, current is transferred to the current limitation element 22, whereby current is limited. After current is limited, the protective controller 12 transmits an interruption command Cb to the opening/closing device 8b on the load line 110b, whereby the opening/closing device 8b interrupts current.

Current can be interrupted by the opening/closing devices 8a and 8b if a resistance value of the current limitation element 22 is preset such that the magnitude of current limited by the current limitation device 6 takes a value equal to or smaller than a current value up to which the opening/closing devices 8a and 8b on the load lines 110a and 110b can perform interruption. In the case of using no current limitation device 6, a current of short circuit or the like needs to be directly interrupted by the opening/closing devices 8a and 8b. Thus, large-sized circuit breakers having high current conduction performances and high interruption performances need to be used. Further, in the case of a DC circuit, there is no current zero point. Thus, the circuit breakers themselves need to have high current limitation performances, resulting in further upsizing.

Meanwhile, if the current limitation device 6 is used as in the present embodiment, small-sized opening/closing devices (e.g., electromagnetic contactors or the like) can be used as the opening/closing devices 8a and 8b on the load lines 110a and 110b, whereby the weight of a power-feeding system can be reduced.

Meanwhile, in a case where, for example, short circuit occurs on the busbar 7, the position of occurrence of the fault cannot be specified with only the current detection values Ia and Ib from the current detectors 9a and 9b. Thus, the protective controller 12 specifies the position (e.g., on the busbar 7) of occurrence of the fault on the basis of the current detection value Io from the current detector 5, and transmits an operation command CL to the current limitation device 6 to limit current. Then, the protective controller 12 transmits an interruption command Co to the AC circuit breaker 3, whereby current is interrupted and the fault is avoided. In addition, if the current detection values Io, Ia, and Ib from the current detectors 5, 9a, and 9b are compared with one another, the position (e.g., on either of the load lines 110a and 110b or on the busbar 7) of occurrence of the fault can be specified.

If a fault such as sudden short circuit occurs in a generally-used power distribution system for a moving body in which no current limitation device 6 is used, interruption is performed by the opening/closing devices 8a and 8b on the load lines 110a and 110b, or interruption is performed by the AC circuit breaker 3 on the main line 100. As a result, the amount of power generated by the power generator 2 exceeds the amount of load-consumed power, and this leads to unbalance between power generated on the power generation side and power consumed on the load side. If the unbalance occurs, power corresponding to an excessive value is consumed inside the power generator 2. Consequently, the power generator 2 is overheated or overvoltage is applied thereto, whereby excessive burden is inflicted on the power generator 2. Further, excessive burden is inflicted also on the engine 1 which is driving the power generator 2, and operation thereof is destabilized. Therefore, the stability of the entire power distribution system for a moving body is reduced.

Meanwhile, if the current limitation device 6 is used as in the present embodiment, power is consumed by the current limitation device 6. Thus, for the power generator 2 side, the fluctuation amount of each load can be reduced, or the fluctuation amount of the load can be set to zero, whereby operation of the power generator 2 can be stabilized even upon a transitional change in output.

Further, since the semiconductor switch 21 is used in the current limitation device 6, the current limitation function can be deactivated by changing the state of the semiconductor switch 21 from an OFF state to an ON state when a fault such as short circuit is eliminated. As a result, restoration from the fault can be performed at a higher speed than in the case of using a mechanical switch, whereby the power distribution system can be further stabilized. As a matter of course, current can be limited also by using a mechanical switch.

The protective controller 12 determines a fault on the basis of the current detection values Io, Ia, and Ib from the current detectors 5, 9a, and 9b which detect currents. Thus, determination and operation can each be performed at a higher speed than in a thermal contactor in which a bimetal used in an ordinary power distribution system for an aircraft is used.

If the current limitation device 6, and the opening/closing device 8a or 8b or the AC circuit breaker 3, individually perform current detection or the like to detect a fault, a standby period may occur in order to coordinate the respective operations. Meanwhile, determination performed in a unified manner by using the protective controller 12 makes it possible to shorten also the time of a coordinating operation.

Alternatively, the current limitation device 6, and the opening/closing device 8a or 8b or the AC circuit breaker 3, can also be operated so as to detect a fault such as short circuit. In this case, the current limitation device 6, and the opening/closing device 8a or 8b or the AC circuit breaker 3, detect currents flowing therethrough to detect a fault such as short circuit. At this time, the following coordination of operations is performed. That is, the current limitation device 6 turns off the semiconductor switch 21 first, to transfer current to the current limitation element 22 so that the current limitation function is activated. Then, after a predetermined period has elapsed, the opening/closing device 8a or 8b or the AC circuit breaker 3 performs interruption. In this case, the protective controller 12 is unnecessary, and thus weight reduction can be achieved.

Meanwhile, each of the DC/AC converters 10a and 10b generally includes a capacitor for the purpose of smoothing or the like, and, at the time of start-up of the power distribution system for a moving body, the start-up needs to be performed from a state where the capacitor is charged. If voltage is suddenly applied from a state where the capacitor is not charged, inrush current flows. High inrush current is a factor that causes a circuit to be damaged or deteriorate. In the present embodiment, if the current limitation device 6 is set to be in a current-limiting operation state at the time of charging the capacitor, inrush current can be mitigated.

Figure 4:
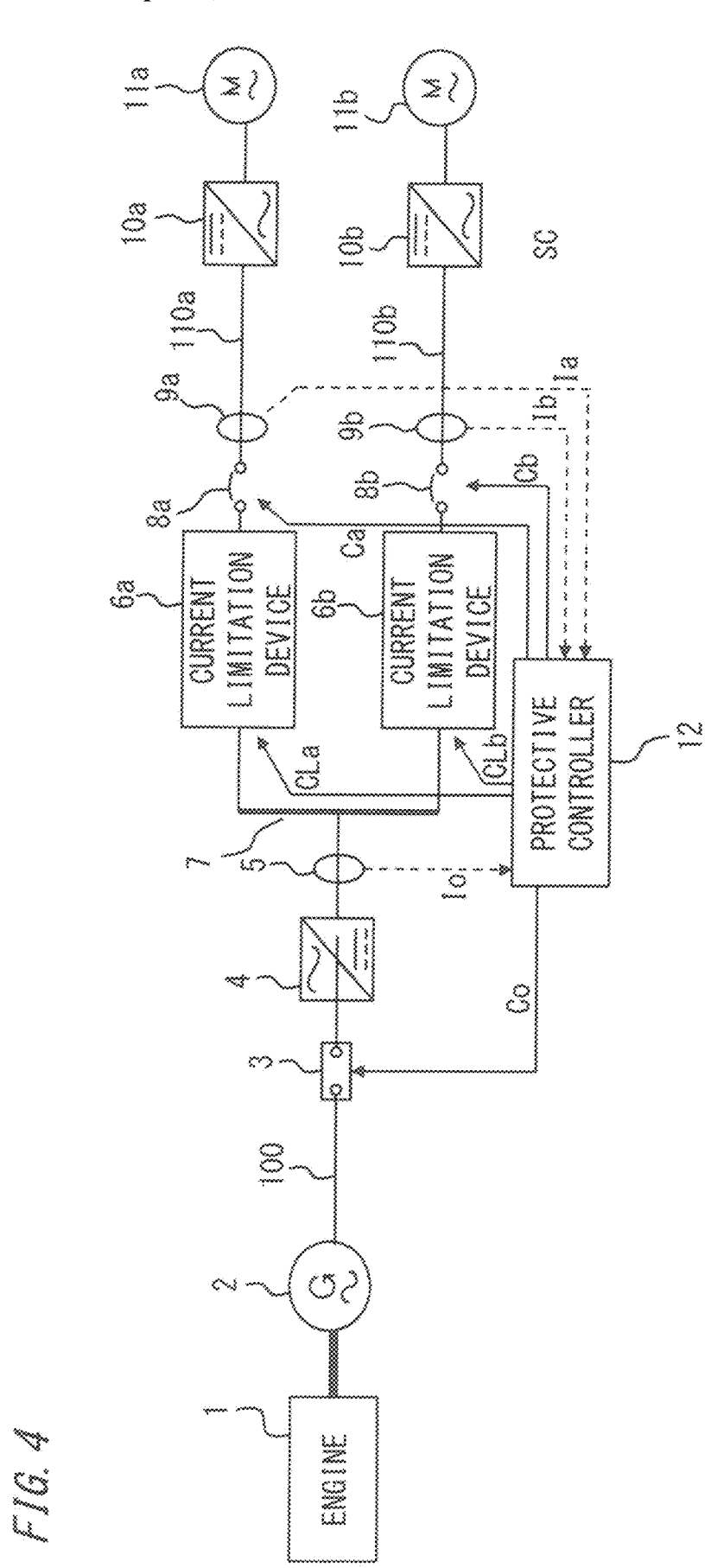
FIG. 4 illustrates another example of the configuration of the power distribution system for a moving body according to embodiment 1.

Although a case where the current limitation device 6 is provided on the lower-order side relative to the AC/DC converter 4 on the main line 100, has been shown in FIG. 1, current limitation devices 6a and 6b may be provided on the respective load lines 110a and 110b so as to be located on the higher-order side relative to, for example, the opening/closing devices 8a and 8b as shown in FIG. 4. In this case, if short circuit occurs on, for example, the load line 110b, the protective controller 12 transmits an operation command CLa to the current limitation device 6b, and the current limitation device 6 turns off the semiconductor switch 21. Consequently, current is transferred to the current limitation element 22, whereby current is limited. After current is limited, the protective controller 12 transmits an interruption command Cb to the opening/closing device 8b on the load line 110b, whereby the opening/closing device 8b interrupts current. Meanwhile, if short circuit occurs on, for example, the busbar 7, the protective controller 12 specifies the position (e.g., on the busbar 7) of occurrence of the fault on the basis of the current detection value Io from the current detector 5, and transmits operation commands CLa and CLb to the current limitation devices 6a and 6b to limit currents. Then, the protective controller 12 transmits an interruption command Co to the AC circuit breaker 3, whereby current is interrupted and the fault is avoided.

However, if the current limitation device 6 is provided on the main line 100 so as to be located on the lower-order side relative to, for example, the AC/DC converter 4 as in FIG. 1, the number of the current limitation devices 6 is smaller than if the respective current limitation devices 6a and 6b are provided on the load lines 110a and 110b as in FIG. 4, whereby weight reduction can be achieved.

Figure 5:
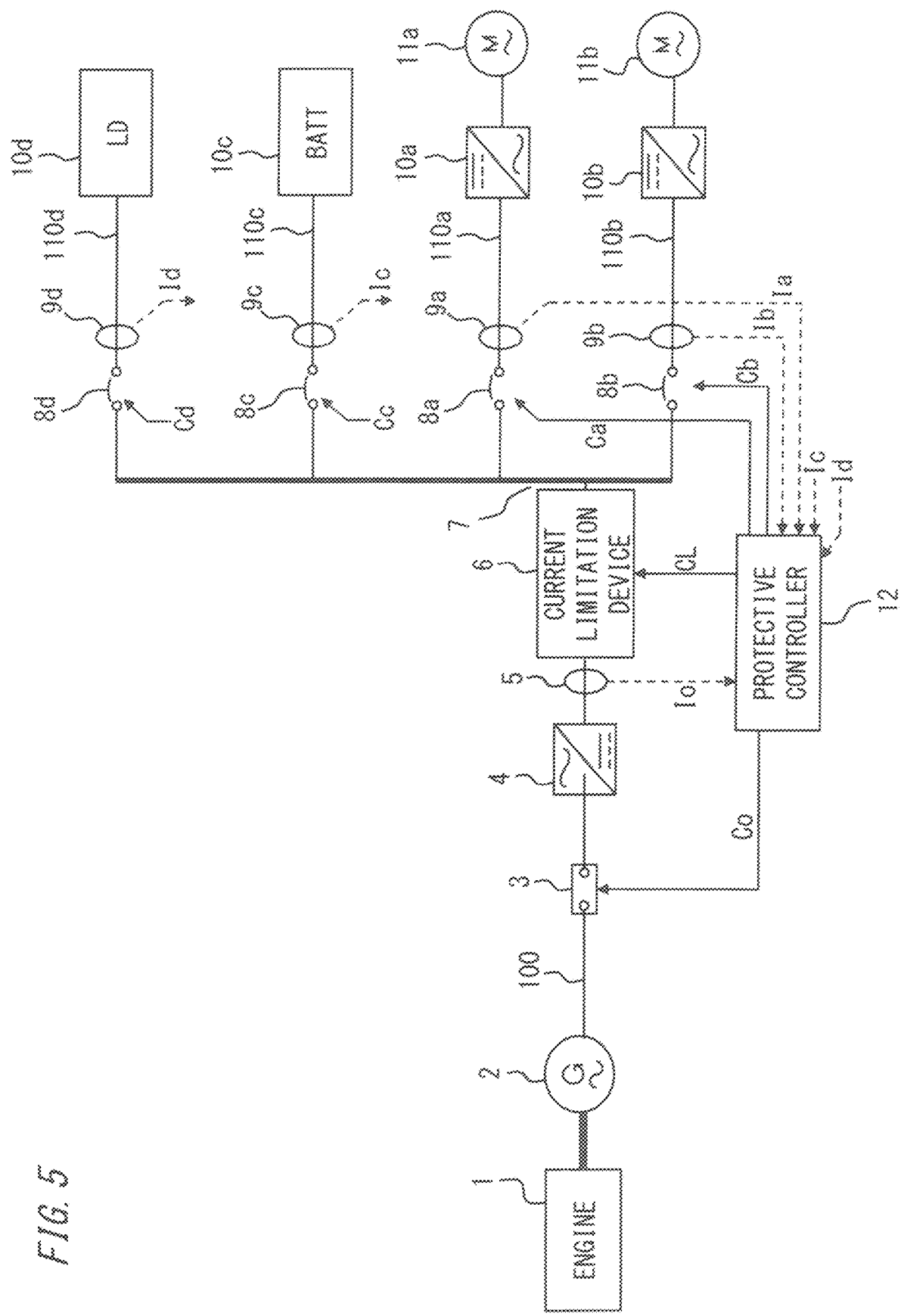
FIG. 5 illustrates another example of the configuration of the power distribution system for a moving body according to embodiment 1.

In addition, although an example in which power is distributed from the main line 100 via the busbar 7 to the two load lines 110a and 110b has been shown in FIG. 1, a load line 110c to which a battery 10c is connected or a load line 110d to which a generally-used load device or a load system 10d is connected may be provided in addition to the load lines 110a and 110b as power lines having branched off from the main line 100, as shown in FIG. 5. The load line 110c is provided with: an opening/closing device 8c which is opened/closed according to an opening/closing command Cc from the protective controller 12; and a current detector 9c which outputs a current detection value Ic. The load line 110d is provided with: an opening/closing device 8d which is opened/closed according to an opening/closing command Cd from the protective controller 12; and a current detector 9d which outputs a current detection value Id.

Figure 6:
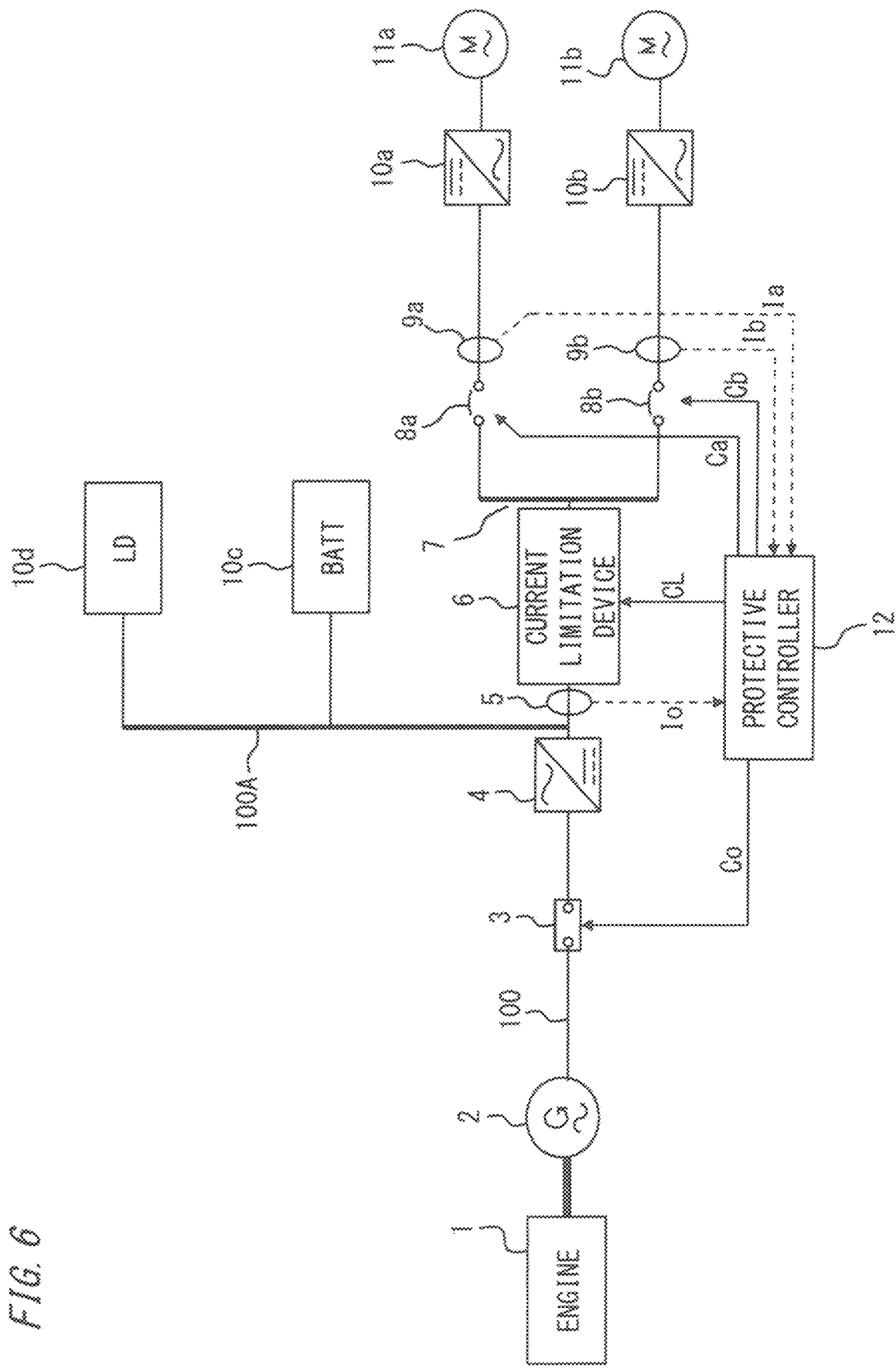
FIG. 6 illustrates another example of the configuration of the power distribution system for a moving body according to embodiment 1.

Alternatively, as shown in FIG. 6, the battery 10c may be connected to a power line 100A having directly branched off from the main line 100, and the generally-used load device or the load system 10d may also be connected to the power line 100A.

As described above, the present embodiment includes: a power generator; and a power line through which power generated by the power generator is transmitted to a load. The power line between the power generator and the load is provided with: a current limitation device configured to, when detecting occurrence of a fault current, limit the fault current; and a current interruption device configured to interrupt current heading for the load, in conjunction with the limitation of the fault current performed by the current limitation device. Consequently, it is possible to prevent occurrence of disturbance in the entire system even if a fault current occurs between the power generator and the load.

In addition, the present embodiment further includes: a current detector on the power line; and a protective controller configured to detect occurrence of the fault current on the basis of a current detection value from the current detector, transmit, to the current limitation device, an operation command to limit the fault current, and transmit, when the fault current is limited, an interruption command to the current interruption device. Consequently, after the current limitation device limits the fault current, the current interruption device can assuredly interrupt current heading for the load.

In addition, each of the current limitation device and the current interruption device is set to have a function of detecting occurrence of the fault current, and, when the fault current occurs, the current limitation device limits the fault current, and then the current interruption device disconnects the power line. Consequently, the protective controller is unnecessary, and thus weight reduction can be achieved.

In addition, the current limitation device has a configuration in which at least one semiconductor switch and at least one current limitation element are connected in parallel. Consequently, the current limitation function can be activated with a simple configuration. Further, since the semiconductor switch is used, the current limitation function can be deactivated by changing the state of the semiconductor switch from an OFF state to an ON state when a fault such as short circuit is eliminated.

In addition, if a resistor or an arrester is used as the current limitation element, a simple configuration can be obtained.

In addition, if an opening/closing device is provided as the current interruption device, downsizing can be achieved.

In addition, the power line includes: a main line connected to the power generator; and a plurality of load lines having branched off from the main line and connected to the loads. The main line is provided with the current limitation device and the current interruption device, and the load lines are provided with the respective current interruption devices. Consequently, the number of the current limitation devices can be reduced, whereby weight reduction can be achieved.

Alternatively, the power line includes: a main line connected to the power generator; and a plurality of load lines having branched off from the main line and connected to the loads. The main line is provided with the current interruption device, and the load lines are provided with the respective current limitation devices and the respective current interruption devices. Consequently, current limitation can be achieved on each load line.

Embodiment 2

In embodiment 1, a case where the current limitation device 6 is provided on the main line 100 so as to be located on the lower-order side relative to the AC/DC converter 4 as shown in FIG. 1, has been described. In contrast, in embodiment 2, a case where the current limitation device 6 is provided on the main line 100 so as to be located on the higher-order side relative to the AC/DC converter 4, will be described.

In the following description regarding embodiment 2, only differences from embodiment 1 will be described. It is noted that the other configurations, operations, and advantageous effects are the same as those in embodiment 1, and thus descriptions thereof will be omitted.

Figure 7:
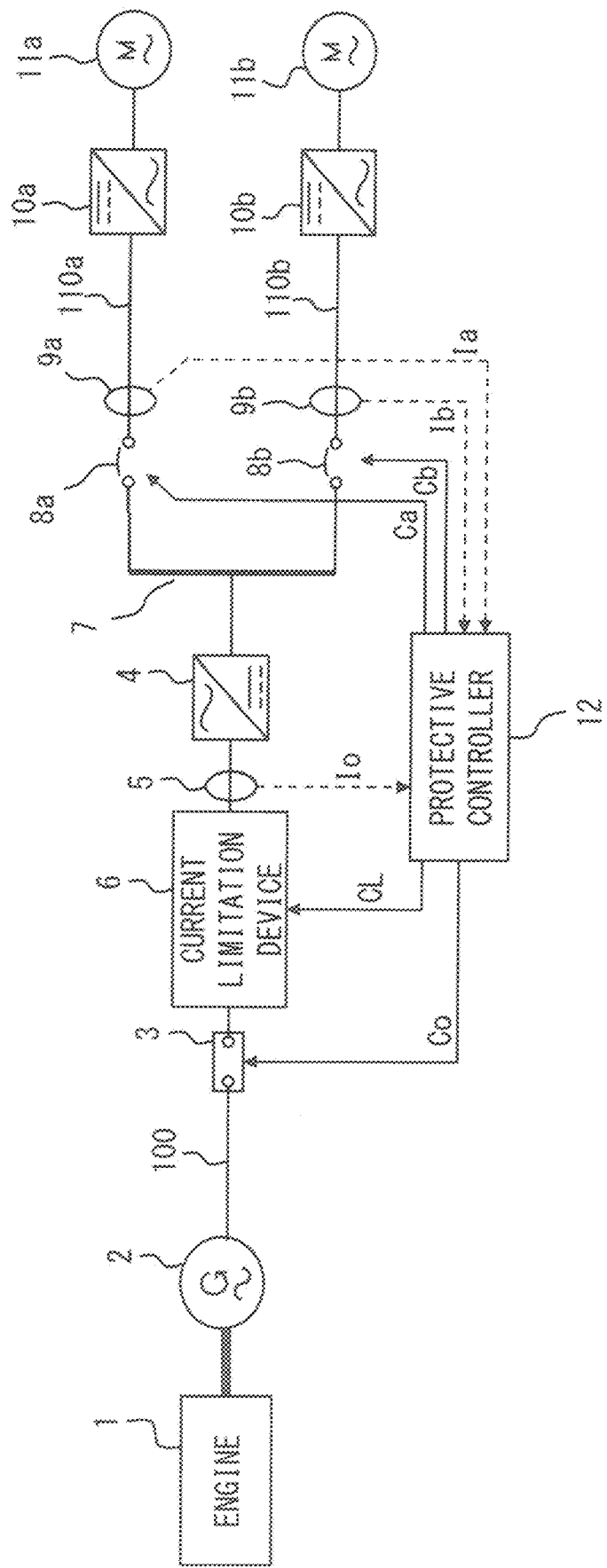
FIG. 7 illustrates an example of the configuration of a power distribution system for a moving body according to embodiment 2.

FIG. 7 illustrates an example of the configuration of a power distribution system for a moving body according to embodiment 2. In FIG. 7, the AC circuit breaker 3, the current limitation device 6, the current detector 5, and the AC/DC converter 4 are connected in this order to the main line 100.

Figure 8:
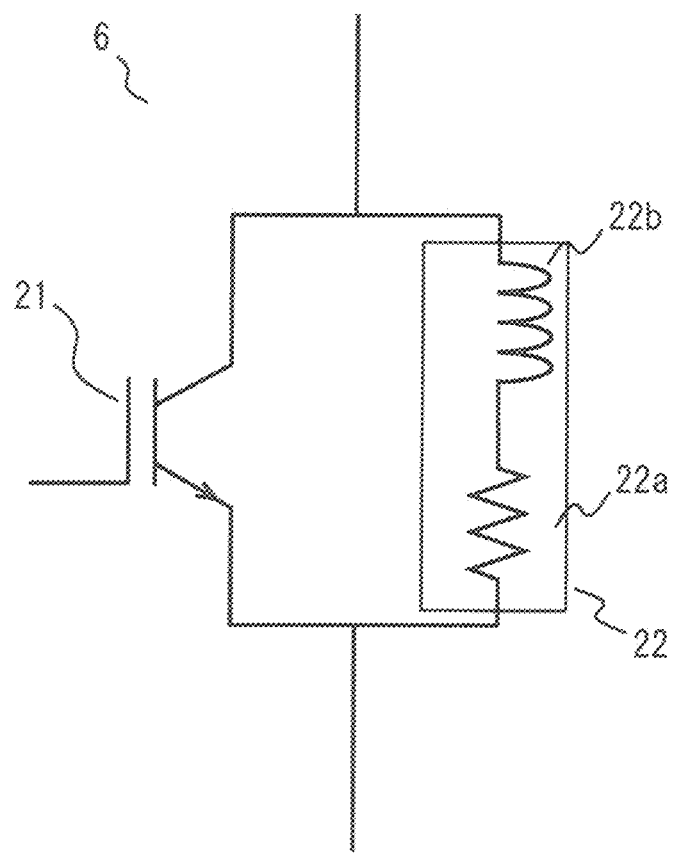
FIG. 8 illustrates an example of the configuration of a current limitation device of the power distribution system for a moving body according to embodiment 2.

In the case of FIG. 7, the current limitation device 6 is provided on AC lines. Thus, if the AC lines are, for example, three lines for three phases, the current limitation device 6 shown in FIG. 2 is provided on each of the three lines for three phases. In addition, since current that flows to the current limitation device 6 is AC current, a current limitation element obtained by connecting not only a resistor 22a but also an inductance element 22b such as a coil or a reactor can be used as the current limitation element 22 as shown in FIG. 8. In this case, heat generated from the current limitation element 22 can be reduced.

In the configuration in which the current limitation device 6 is provided on the lower-order side relative to the AC/DC converter 4 as shown in FIG. 1, the advantageous effect of current limitation operation by the current limitation device 6 cannot be obtained at the time of interruption by the AC circuit breaker 3 if a fault such as short circuit occurs between the AC circuit breaker 3 and the current limitation device 6. However, in the configuration shown in FIG. 7, the advantageous effect of current limitation operation by the current limitation device 6 is obtained even if a fault occurs at a device or on a power line on the lower-order side relative to the current detector 5.

Figure 9:
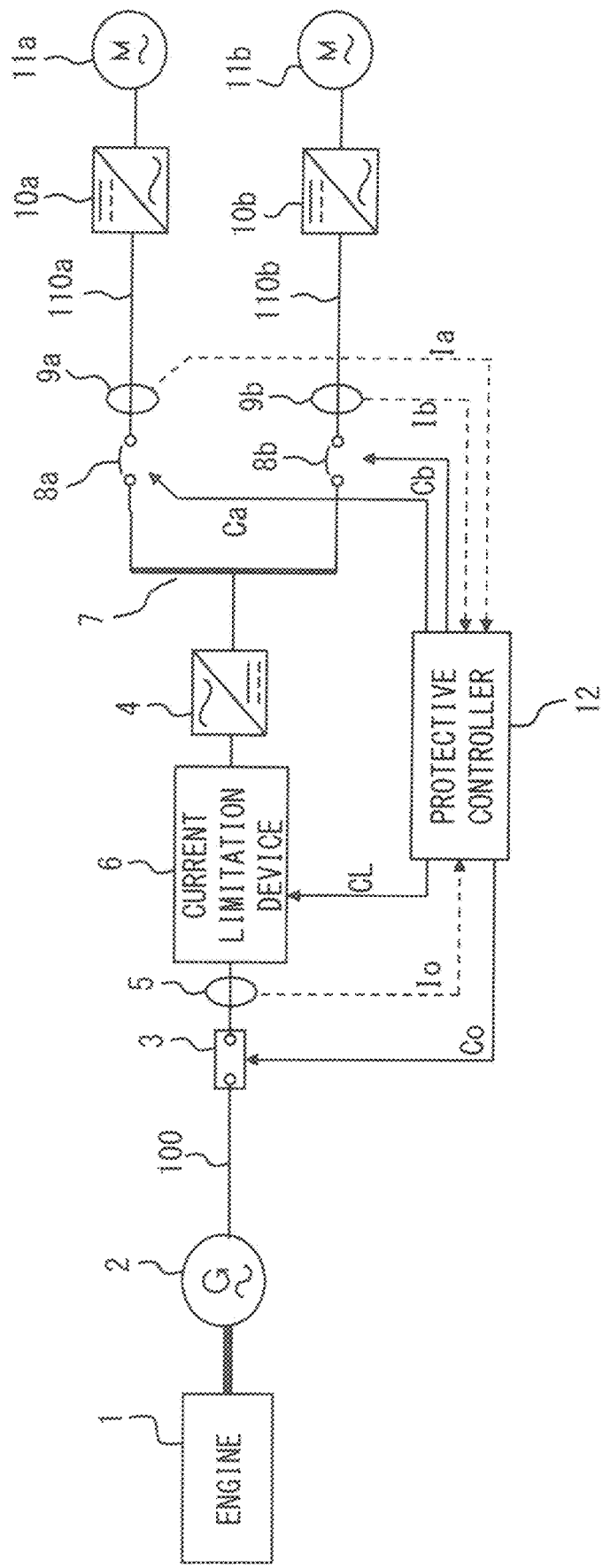
FIG. 9 illustrates an example of the configuration of the power distribution system for a moving body according to embodiment 2.

In addition, in a case where the AC circuit breaker 3, the current detector 5, the current limitation device 6, and the AC/DC converter 4 are connected in this order to the main line 100 as shown in FIG. 9, the advantageous effect of current limitation operation by the current limitation device 6 is obtained even if a fault occurs at a device or on a power line on the lower-order side relative to the current limitation device 6.

Figure 10:
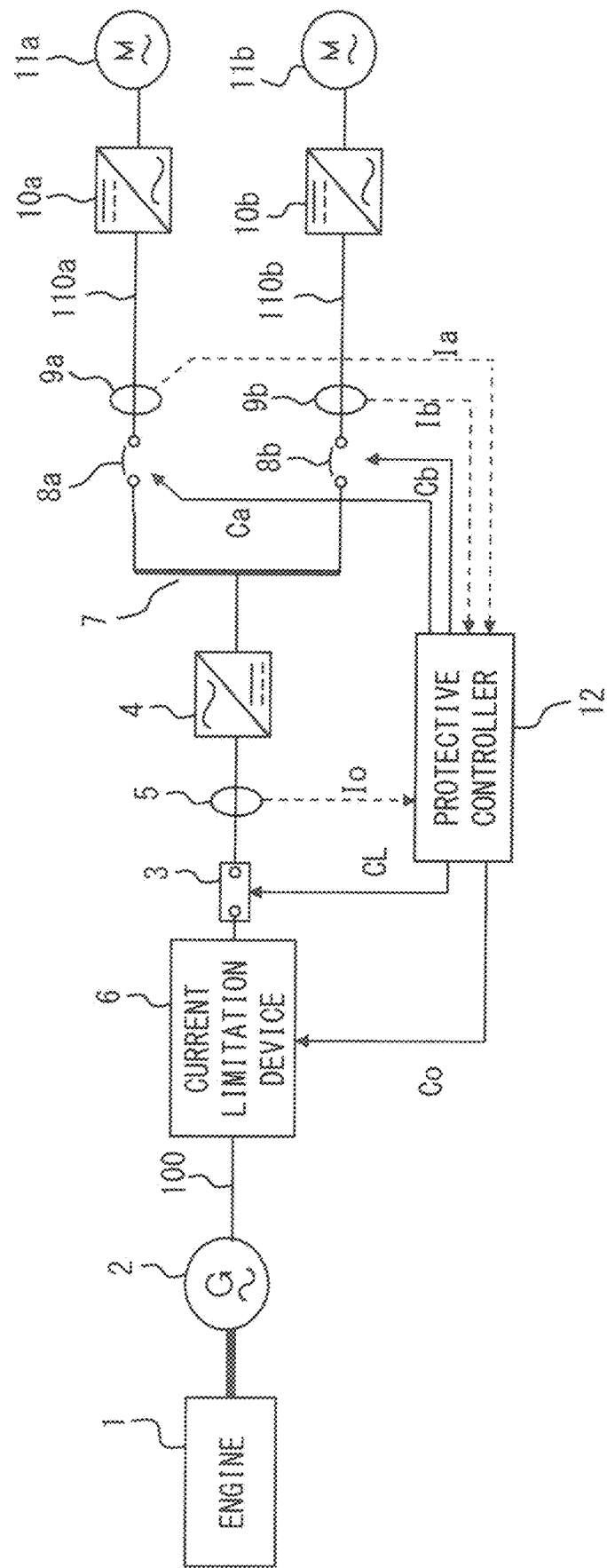
FIG. 10 illustrates another example of the configuration of the power distribution system for a moving body according to embodiment 2.

Further, the same applies also to a case where the current limitation device 6, the AC circuit breaker 3, the current detector 5, and the AC/DC converter 4 are connected in this order to the main line 100 as shown in FIG. 10. That is, in this case as well, the advantageous effect of current limitation operation by the current limitation device 6 is obtained if a fault occurs at a device or on a power line on the lower-order side relative to the current limitation device 6.

As described above, in the present embodiment, in a case of providing the current limitation device on an AC line, a current limitation element obtained by connecting a resistor and an inductance element is used as the current limitation element, whereby heat generated from the current limitation element can be reduced.

Embodiment 3

A power distribution system for a moving body according to embodiment 3 includes a current limitation device in which a mechanical switch is provided in parallel to the semiconductor switch and the current limitation element.

In the following description regarding embodiment 3, only differences from the aforementioned embodiments will be described. It is noted that the other configurations, operations, and advantageous effects are the same as those in the aforementioned embodiments, and thus descriptions thereof will be omitted.

Figure 11:
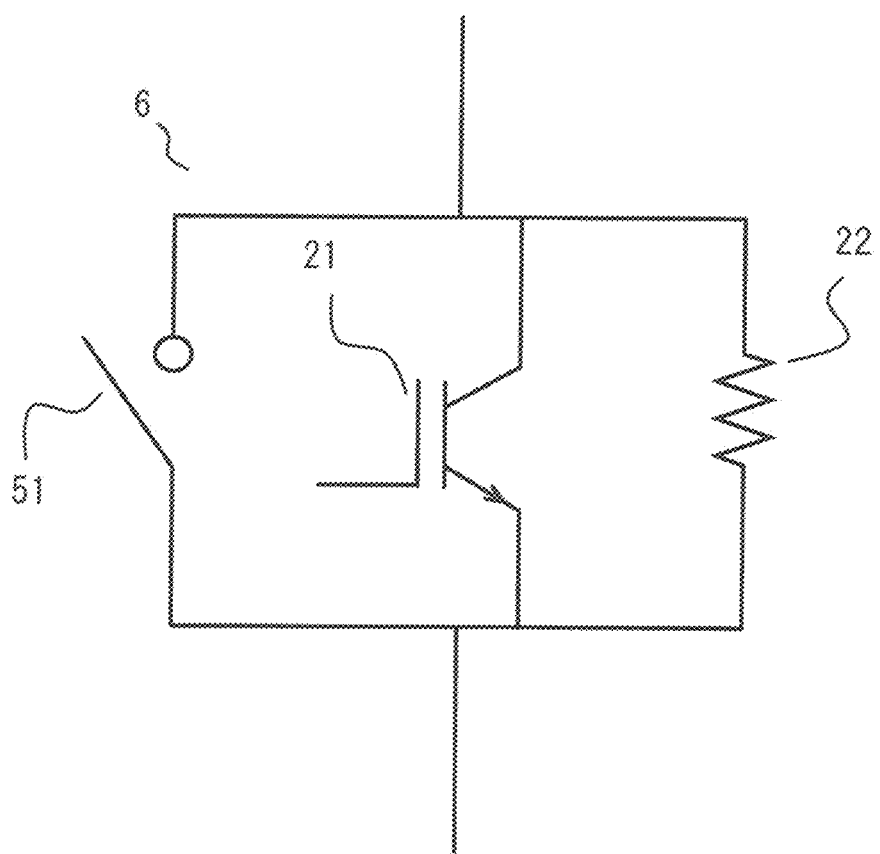
FIG. 11 illustrates an example of the configuration of a current limitation device of a power distribution system for a moving body according to embodiment 3.

FIG. 11 illustrates an example of the configuration of the current limitation device of the power distribution system for a moving body according to embodiment 3. As shown in FIG. 11, the current limitation device 6 in the present embodiment has a hybrid configuration in which a mechanical switch 51, the semiconductor switch 21, and the current limitation element 22 are connected in parallel.

Figure 12C:
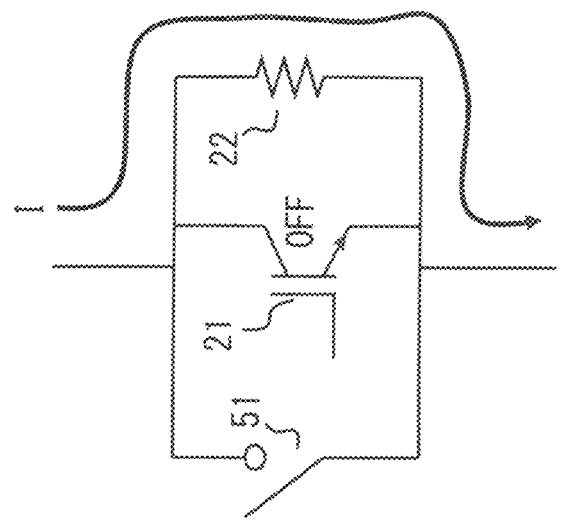
FIG. 12C illustrates an operation of the current limitation device of the power distribution system for a moving body according to embodiment 3.
Figure 12B:
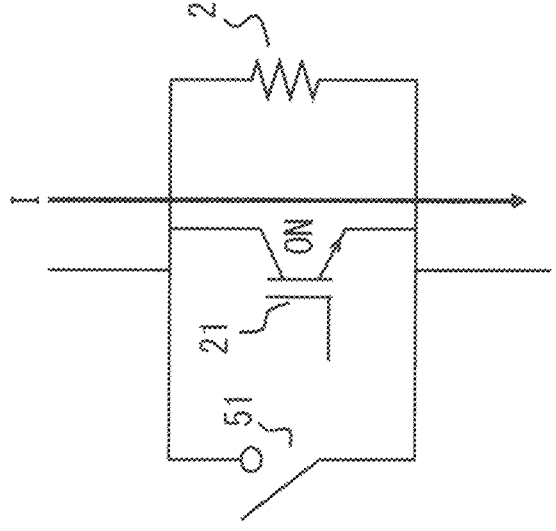
FIG. 12B illustrates an operation of the current limitation device of the power distribution system for a moving body according to embodiment 3.
Figure 12A:
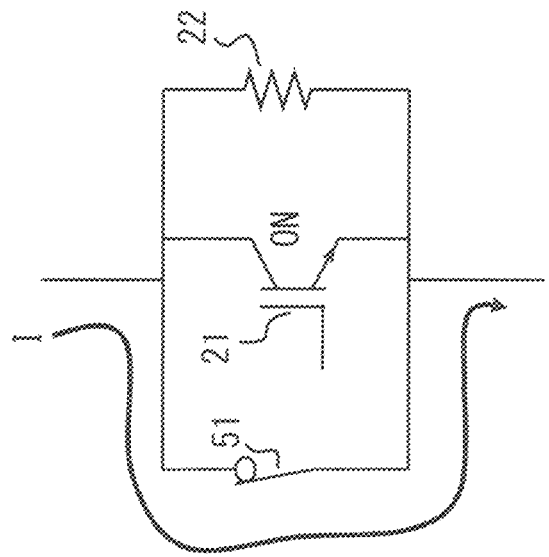
FIG. 12A illustrates an operation of the current limitation device of the power distribution system for a moving body according to embodiment 3.

FIG. 12A, FIG. 12B, and FIG. 12C illustrate operations of the current limitation device 6 in the present embodiment.

As shown in FIG. 12A, at the time of normal current conduction, the mechanical switch 51 is in a closed state, and the semiconductor switch 21 is also in an ON state. At this time, since the semiconductor switch 21 has an ON resistance, a current I flows through the mechanical switch 51.

When a fault such as short circuit occurs as shown in FIG. 12B, the mechanical switch 51 is opened to transfer the current I to the semiconductor switch 21.

Then, when the semiconductor switch 21 is turned off as shown in FIG. 12C, the current I is transferred to the current limitation element 22, to limit current.

The transference of current from the mechanical switch 51 is dependent on the arc resistance of an arc that is generated when the mechanical switch 51 is opened. If there is no semiconductor switch 21, an arc resistance exceeding the resistance of the current limitation element 22 needs to be generated. Meanwhile, if current is transferred to the semiconductor switch 21, the arc resistance only has to be approximately the ON resistance of the semiconductor switch 21, and thus a small-sized mechanical switch 51 only has to be used, and the time taken to transfer current can be shortened.

Figure 13:
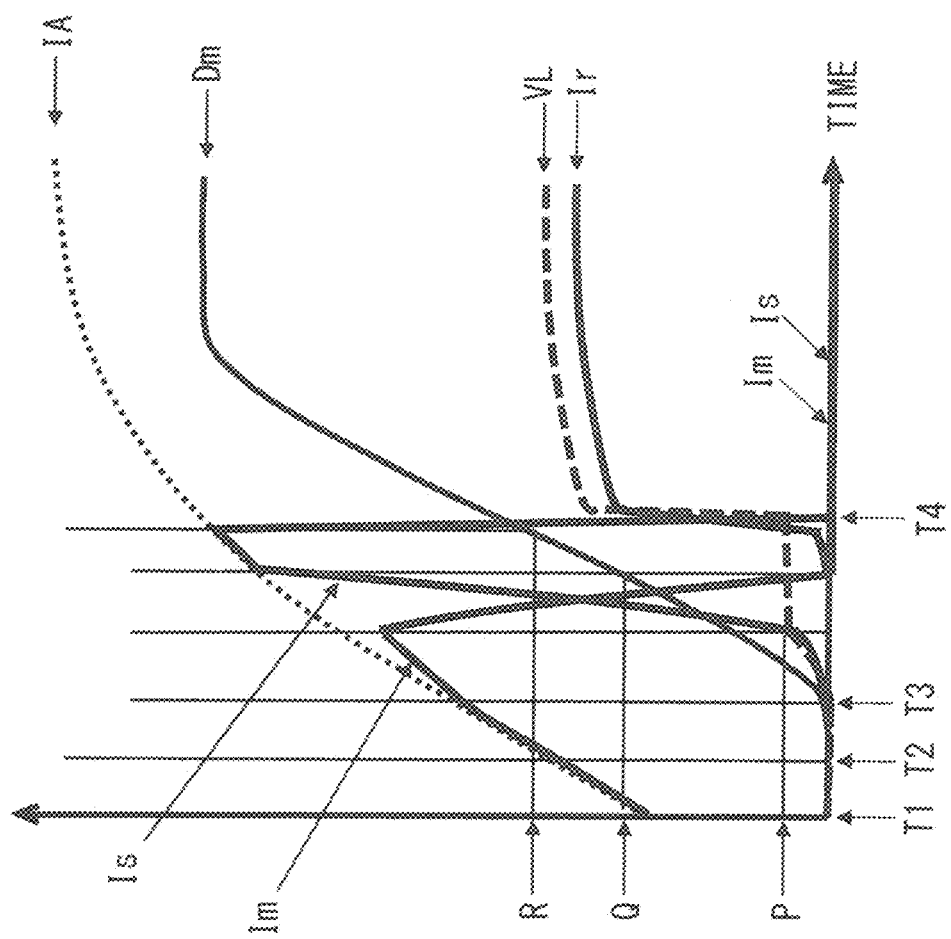
FIG. 13 illustrates an inter-terminal voltage and currents flowing through respective elements of the current limitation device of the power distribution system for a moving body according to embodiment 3.

FIG. 13 illustrates an inter-terminal voltage and currents flowing through respective elements of the current limitation device 6 in the present embodiment.

In FIG. 13, the horizontal axis indicates time, T1 indicates a time point of occurrence of a short circuit, T2 indicates a time point at which the protective controller 12 detects the short circuit and outputs an opening command to the mechanical switch 51, T3 indicates a time point at which contacts of the mechanical switch 51 are separated from each other so that current transference to the semiconductor switch 21 is started, and T4 indicates a time point at which the semiconductor switch 21 is turned off and the current transference to the current limitation element 22 is completed.

In addition, in FIG. 13, Im indicates the waveform of a current flowing through the mechanical switch 51, Is indicates the waveform of a current flowing through the semiconductor switch 21, Ir indicates the waveform of a current flowing through the current limitation element 22, VL indicates the inter-terminal voltage of the current limitation device 6, Dm indicates the inter-electrode distance of the mechanical switch 51, and IA indicates the waveform of a short circuit current obtained when no current limitation is performed.

Further, in FIG. 13, an arrow P indicates a point at which an arc voltage (equal to the inter-terminal voltage of the current limitation device 6) exceeds the ON voltage of the semiconductor switch 21, an arrow Q indicates a point at which the arc is extinguished, and an arrow R indicates a point at which the inter-electrode withstand voltage of the mechanical switch 51 takes a value that allows the mechanical switch 51 to withstand the inter-terminal voltage.

In FIG. 13, when the arc voltage (equal to the inter-terminal voltage of the current limitation device 6) exceeds the ON voltage of the semiconductor switch 21 as indicated by the arrow P, current is transferred from the mechanical switch 51 to the semiconductor switch 21. After the semiconductor switch 21 is turned off, the inter-terminal voltage of the current limitation element 22 is applied between the electrodes of the mechanical switch 51. The semiconductor switch 21 is set to be kept turned on until attainment of an inter-electrode distance at which the inter-electrode withstand voltage of the mechanical switch 51 takes a value that allows the mechanical switch 51 to withstand the inter-terminal voltage of the current limitation element 22 at the time of the said application. The ON or OFF command for the semiconductor switch 21 may be given by the protective controller 12, or a dedicated gate circuit may be separately provided.

If there is no mechanical switch 51, current is conducted through the semiconductor switch 21 in a normal case, and this leads to occurrence of loss in conducted current consumed by the ON resistance of the semiconductor switch 21. If the mechanical switch 51 is used in parallel, the loss in the conducted current can be reduced.

Both the mechanical switch 51 and the semiconductor switch 21 may be configured to start operations according to commands from the protective controller 12. Alternatively, a configuration may be employed in which only the mechanical switch 51 independently detects overcurrent by means of a current detector, a bimetal, or the like and is independently opened. Even in this case, only current transference to the semiconductor switch 21 is performed, and thus, as long as the semiconductor switch 21 is configured to be opened according to a command from the protective controller 12, an advantageous effect equivalent to that exhibited when current limitation operation is started according to a command from the protective controller 12, is obtained. This is because the mere current transference to the semiconductor switch 21 is substantially equivalent to maintaining of the current-conducted state in a normal case, and a current-limited state is not attained. With this configuration, the mechanical switch 51 starts operation without waiting for a command. Thus, recovery is achieved so as to compensate for a slow opening operation of the mechanical switch 51, whereby the mechanical switch 51 can be operated at high speed.

Regarding closing, both the mechanical switch 51 and the semiconductor switch 21 are operated according to commands from the protective controller 12. Since the semiconductor switch 21 is used, restoration can be achieved at a higher speed.

At a high altitude for, for example, a flight of an aircraft, the atmospheric pressure is lower than on the ground. It is known that low atmospheric pressure leads to reduction in insulation performance according to Paschen's law. Further, interruption performance is also reduced. Considering this, a mechanical switch that is, at least at the periphery thereof including electrodes, put in a sealed container is used as the mechanical switch 51 so as not to be influenced by the atmospheric pressure. Alternatively, the mechanical switch 51 may be such that an operation device for driving the electrodes is disposed in a sealed container altogether. The semiconductor switch 21 is not influenced by the atmospheric pressure if the semiconductor switch 21 has a structure in which the insulation performance of only a housing thereof is increased according to reduction in the atmospheric pressure, since the interval between the electrodes itself is a solid.

Figure 14:
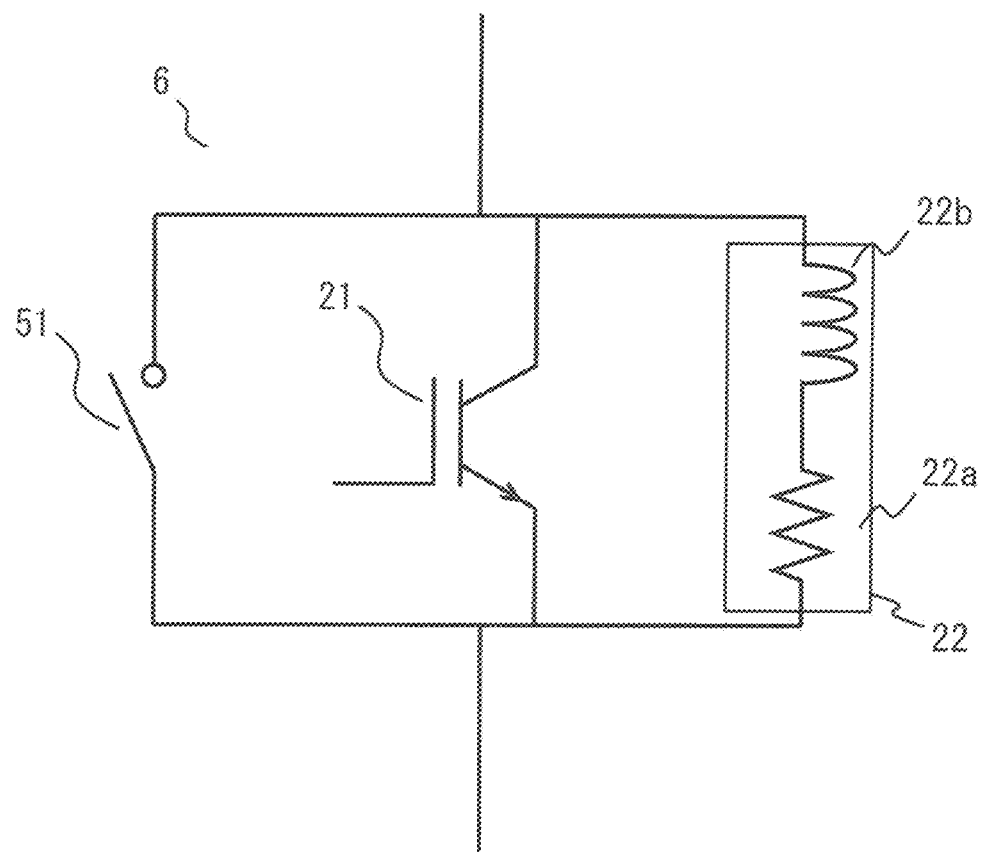
FIG. 14 illustrates an example of the configuration of the current limitation device of the power distribution system for a moving body according to embodiment 3.

If the current limitation device 6 in the present embodiment is provided on an AC line, a current limitation element obtained by connecting not only the resistor 22a but also the inductance element 22b such as a coil or a reactor can be used as the current limitation element 22 as shown in FIG. 14. In this case, heat generated from the current limitation element 22 can be reduced.

As described above, in the present embodiment, the current limitation device has a configuration in which a mechanical switch, a semiconductor switch, and a current limitation element are connected in parallel. Consequently, the loss in the conducted current can be reduced.

In addition, in a normal case, current is conducted through the mechanical switch, and, upon occurrence of the fault current, current is transferred from the mechanical switch to the semiconductor switch first, and then current is transferred from the semiconductor switch to the current limitation element. Consequently, the current limitation function of the current limitation device can be activated.

Embodiment 4

In a power distribution system for a moving body according to embodiment 4, a DC reactor is provided on the higher-order side relative to the current limitation device.

In the following description regarding embodiment 4, only differences from the aforementioned embodiments will be described. It is noted that the other configurations, operations, and advantageous effects are the same as those in the aforementioned embodiments, and thus descriptions thereof will be omitted.

Figure 15:
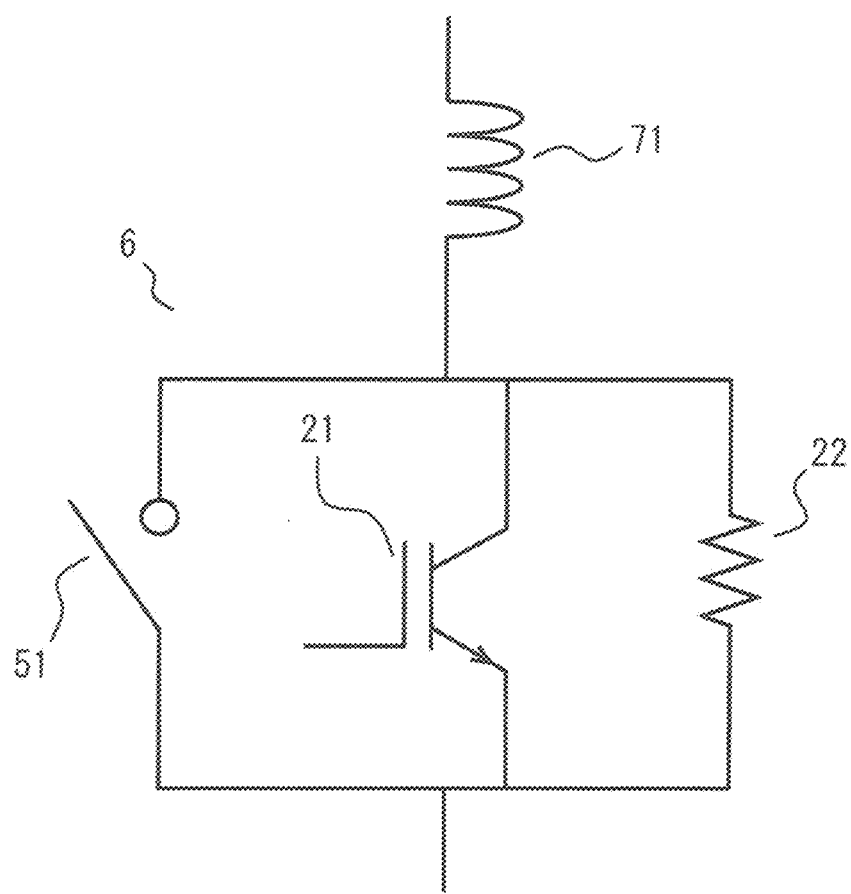
FIG. 15 illustrates another example of the configuration of a current limitation device mounted with a DC reactor in embodiment 4.

FIG. 15 illustrates an example of the configuration of the current limitation device mounted with the DC reactor in embodiment 4.

In the present embodiment, a DC reactor 71 is mounted on the higher-order side relative to the current limitation device 6 as shown in FIG. 15 so that the rate of temporal increase in current is reduced. Consequently, the time taken to transfer current is elongated.

In embodiment 3, current transference from the mechanical switch 51 to the semiconductor switch 21 has to be completed before a fault current such as short circuit current reaches the current capacity of the semiconductor switch 21. Considering this, the DC reactor 71 is mounted. Consequently, the rate of increase in the fault current can be reduced, whereby the time taken to transfer current is elongated. Therefore, the mechanical switch 51 does not need to be opened at an excessively high speed and can be configured to have a small-sized opening operation device, whereby the weight of the mechanical switch 51 can be reduced.

As described above, in the present embodiment, the DC reactor is provided on the higher-order side, i.e., the power generator side, relative to the current limitation device, and thus the rate of increase in the fault current can be reduced. This leads to elongation of the time taken to transfer current from the mechanical switch to the semiconductor switch, whereby the mechanical switch does not need to be opened at an excessively high speed.

Embodiment 5

In embodiment 5, the protective controller is configured to be able to give an output adjustment command to the power generator.

In the following description regarding embodiment 5, only differences from the aforementioned embodiments will be described. It is noted that the other configurations, operations, and advantageous effects are the same as those in the aforementioned embodiments, and thus descriptions thereof will be omitted.

Figure 16:
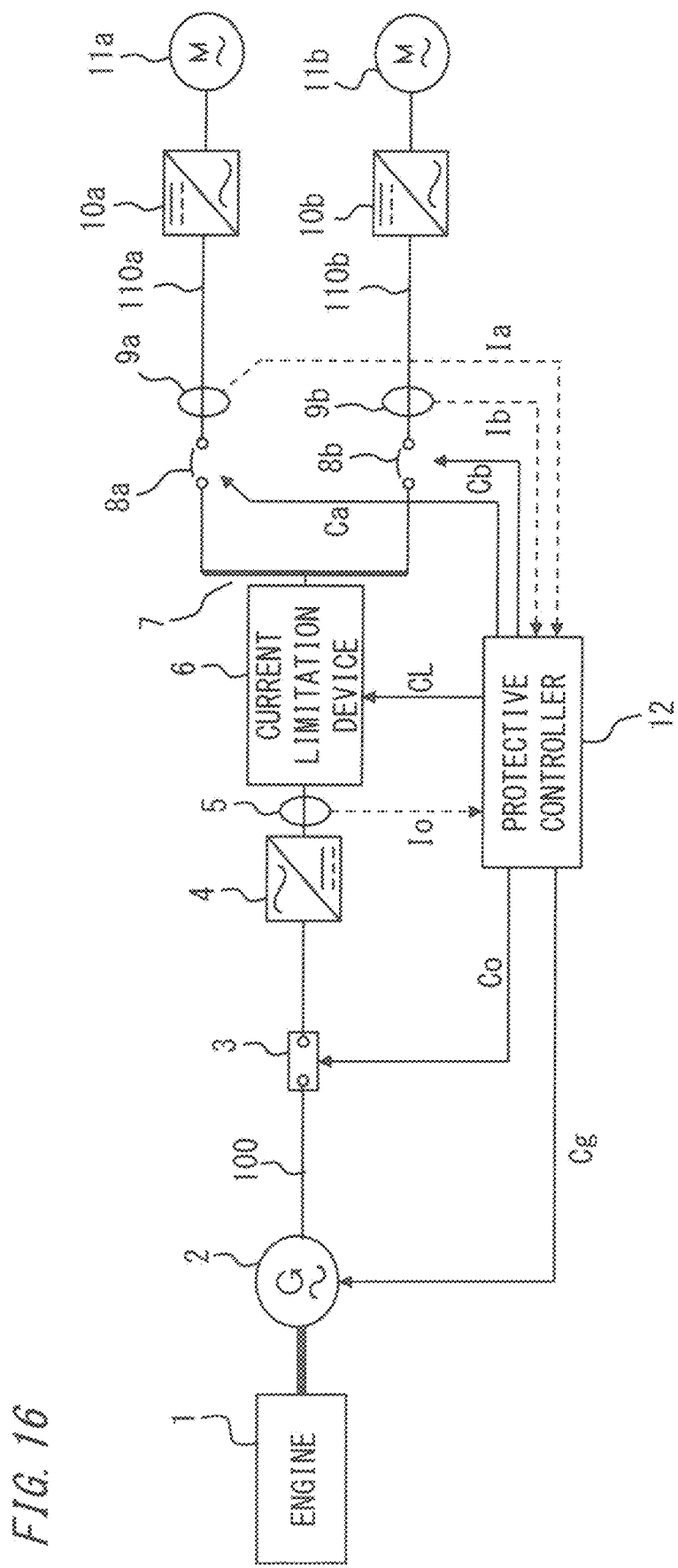
FIG. 16 illustrates an example of the configuration of a power distribution system for a moving body according to embodiment 5.

FIG. 16 illustrates an example of the configuration of a power distribution system for a moving body according to embodiment 5.

As shown in FIG. 16, the protective controller 12 is configured to be able to give an output adjustment command Cg to the power generator 2.

If, for example, a fault such as short circuit occurs on one of the load lines (load line 110b) as shown in FIG. 3, the current limitation device 6 is operated, the opening/closing device 8b interrupts current, and then the current limitation operation is ended, only one load, i.e., the propulsion motor 11a, is driven. As a result, the load consumption amount becomes smaller than that before occurrence of the fault, and thus the output of the power generator 2 needs to be adjusted.

In this case, if the protective controller 12 gives the output adjustment command Cg to the power generator 2 at the time of operation of the current limitation device 6, the output of the power generator 2 is also adjusted as well as the operation of the current limitation device 6 so that output fluctuation can be moderated. Therefore, stabilization of the power distribution system for a moving body can be smoothly performed.

If the power generator 2 is a synchronous power generator, the output of the power generator 2 is adjusted by, for example, adjusting field current of the power generator 2.

As described above, in the present embodiment, the protective controller is set to have a function of giving an output adjustment command to the power generator when detecting occurrence of the fault current, and the power generator adjusts, on the basis of the output adjustment command, an output amount of the power generator according to a fluctuation amount of the load. Consequently, the output of the power generator is adjusted, and output fluctuation can be moderated. Therefore, stabilization of the power distribution system for a moving body can be smoothly performed.

Embodiment 6

In embodiment 6, a grounding device is provided on the lower-order side (load side) relative to a current limitation device.

In the following description regarding embodiment 6, only differences from the aforementioned embodiments will be described. It is noted that the other configurations, operations, and advantageous effects are the same as those in the aforementioned embodiments, and thus descriptions thereof will be omitted.

Figure 17:
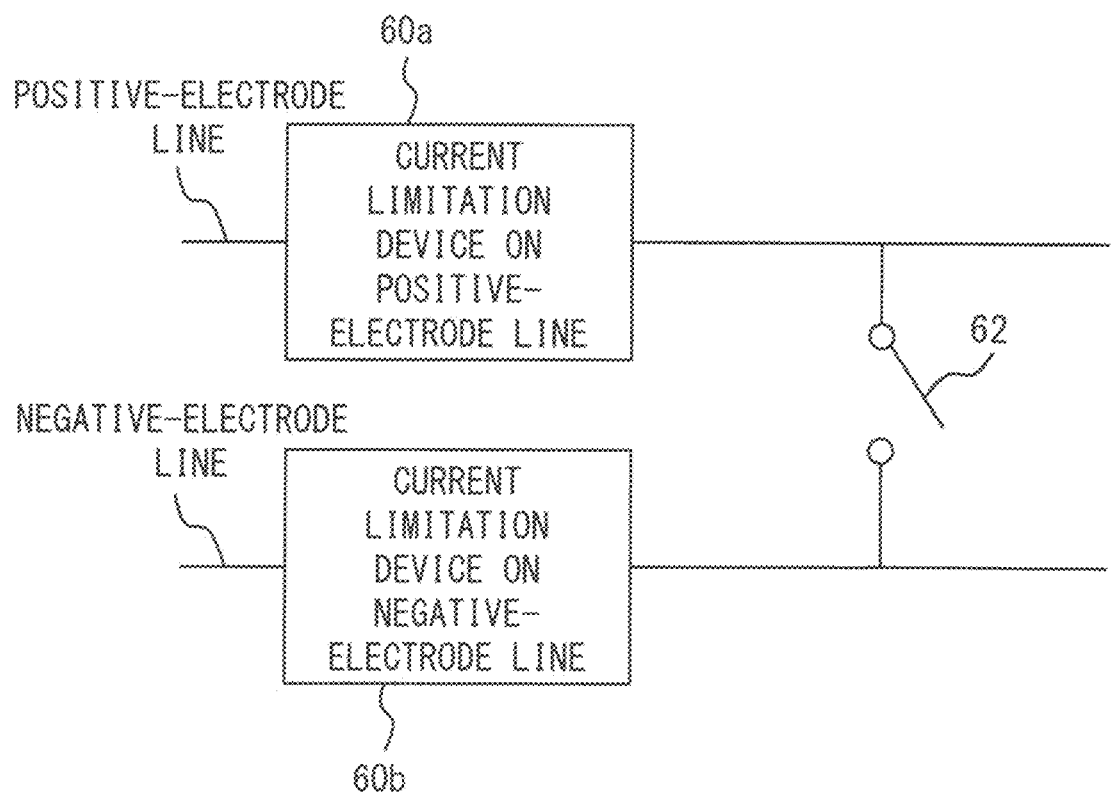
FIG. 17 illustrates an example of the configuration of a current limitation device of a power distribution system for a moving body according to embodiment 6.

FIG. 17 illustrates an example of the configuration of the current limitation device of a power distribution system for a moving body according to embodiment 6.

As shown in FIG. 17, a grounding device 62 for performing short-circuiting between the positive-electrode line and the negative-electrode line is provided on the load side relative to a current limitation device 60a on the positive-electrode line and a current limitation device 60b on the negative-electrode line.

In FIG. 1, in a case where faults concurrently occur on the power lines leading to the two propulsion motors 11a and 11b or in the propulsion motors 11a and 11b, the opening/closing devices 8a and 8b on the respective power lines need to be opened so as to interrupt currents heading for both propulsion motors 11a and 11b. Besides this case, in cases of attaining these states such as a case where faults occur on the busbar 7, a state where the loads are completely absent is suddenly attained, whereby a very significant load fluctuation occurs. Even when the current limitation device 6 is being operated, if both opening/closing devices 8a and 8b on the power lines are opened, current that flows through the current limitation device 6 also disappears. Consequently, the advantageous effect of mitigation by the current limitation device 6 is reduced.

Considering this, as shown in FIG. 17, the grounding device 62 for performing short-circuiting between the positive-electrode line and the negative-electrode line is provided on the lower-order side (load side) relative to the current limitation devices 60a and 60b. Consequently, by closing the grounding device 62 before interruption by the opening/closing devices 8a and 8b, the current limitation devices 60a and 60b can be temporarily used as loads without blocking current flowing through the power generator 2. In addition, when the grounding device 62 is closed, the voltage of the busbar 7 becomes zero. Consequently, no voltages are applied to the opening/closing devices 8a and 8b, and the opening/closing devices 8a and 8b can be opened without forming any arcs. Thus, interruption can be performed more assuredly. Further, if low current is kept flowing without interrupting current, it is possible to maintain a state where load current is flowing to the power generator 2 on the higher-order side without being blocked. Consequently, excessive burden is inflicted on neither the power generator 2 nor the engine 1, and the entire power distribution system for a moving body can be kept in a stable state without experiencing disturbance.

Although a configuration in which short-circuiting between the positive-electrode line and the negative-electrode line of the DC circuit is performed has been shown in the example in FIG. 17, a configuration in which short-circuiting between the positive-electrode line and the ground line or between the negative-electrode line and the ground line is performed may be employed. In the case of a three-phase AC circuit, a configuration in which short-circuiting among the phases is performed may be employed, or a configuration in which short-circuiting between each phase and the ground line is performed may be employed.

As described above, in the present embodiment, the grounding device is provided on the load side relative to the current limitation device. Consequently, by closing the grounding device, the current limitation device can be operated as a load without blocking current flowing through the power generator.

Embodiment 7

In embodiment 7, the AC/DC converter or the DC/AC converters are used as current interruption devices.

In the following description regarding embodiment 7, only differences from the aforementioned embodiments will be described. It is noted that the other configurations, operations, and advantageous effects are the same as those in the aforementioned embodiments, and thus descriptions thereof will be omitted.

Figure 18:
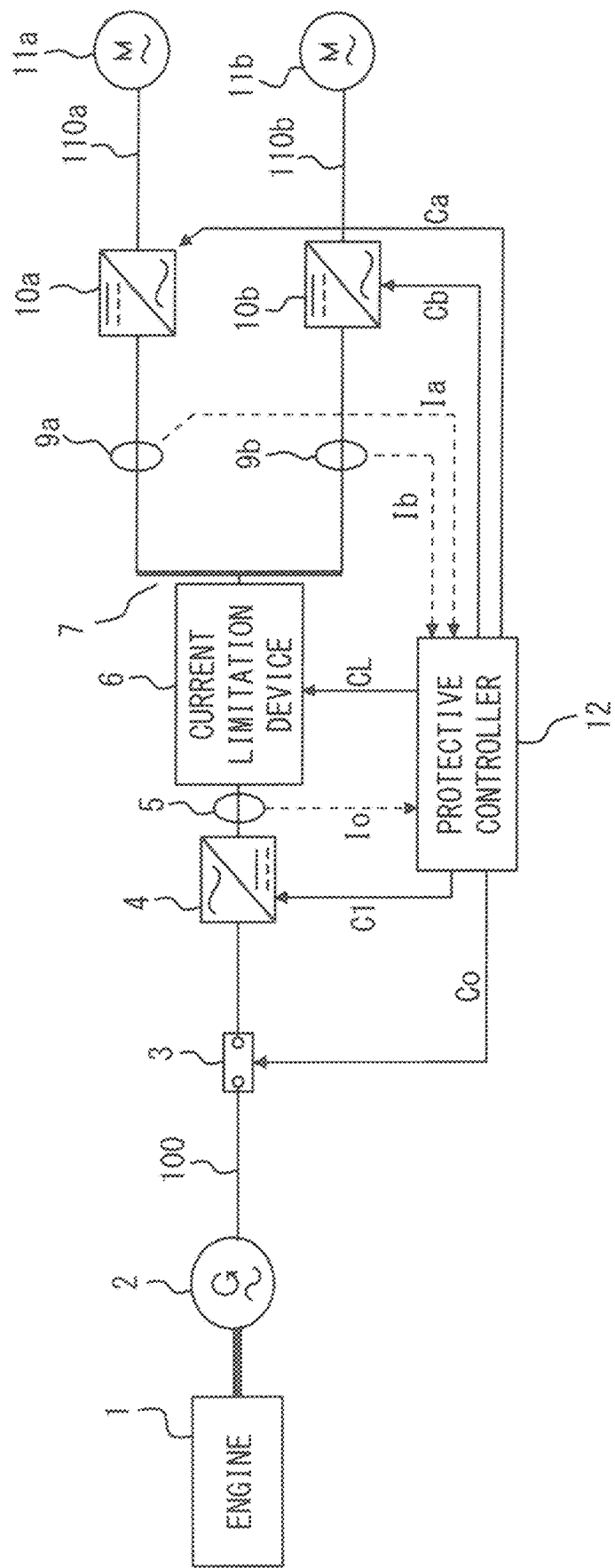
FIG. 18 illustrates an example of the configuration of a power distribution system for a moving body according to embodiment 7.

FIG. 18 illustrates an example of the configuration of a power distribution system for a moving body according to embodiment 7.

In FIG. 18, as compared with FIG. 1, the opening/closing devices 8a and 8b are omitted, and the AC/DC converter 4 and the DC/AC converters 10a and 10b serve as current interruption devices. The AC/DC converter (converter) and the DC/AC converters (inverters) can control current and are considered to have abilities to interrupt current. Even if the AC/DC converter (converter) and the DC/AC converters (inverters) themselves do not have abilities to interrupt ground fault current or the like, ground fault current or the like can be interrupted through current limitation by the current limitation device 6.

Specifically, in FIG. 18, when the protective controller 12 detects a fault such as short circuit or ground fault, the protective controller 12 transmits an operation command CL to the current limitation device 6 so as to cause the current limitation device 6 to activate the current limitation function, and then transmits current interruption commands C1, Ca, and Cb to the AC/DC converter 4 and the DC/AC converters 10a and 10b as current interruption devices, whereby current can be interrupted.

As described above, in the present embodiment, the power generator is an AC power generator, an AC/DC converter is connected to the main line, a DC/AC converter is connected to each load line, and each of the AC/DC converter and the DC/AC converter serves as the current interruption device. Consequently, the opening/closing devices as current interruption devices can be omitted.

Embodiment 8

In a power distribution system for a moving body according to embodiment 8, AC lines are used as power lines through which power generated by the power generator is transmitted to the loads.

In the following description regarding embodiment 8, only differences from the aforementioned embodiments will be described. It is noted that the other configurations, operations, and advantageous effects are the same as those in the aforementioned embodiments, and thus descriptions thereof will be omitted.

Figure 19:
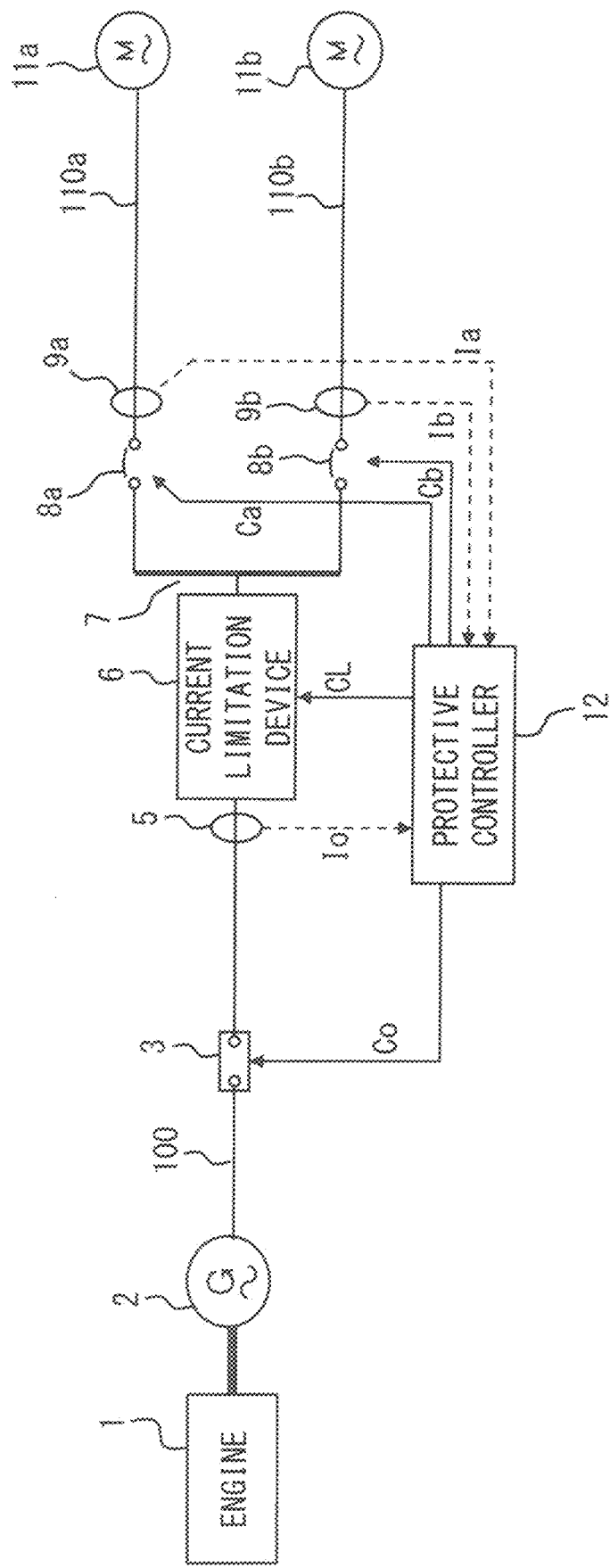
FIG. 19 illustrates an example of the configuration of a power distribution system for a moving body according to embodiment 8.

FIG. 19 illustrates an example of the configuration of the power distribution system for a moving body according to embodiment 8.

In FIG. 19, as compared with FIG. 1, the AC/DC converter 4 and the DC/AC converters 10a and 10b are omitted, and all of the main line 100 and the load lines 110a and 110b through which power generated by the power generator 2 is transmitted to the propulsion motors 11a and 11b as loads, are AC lines.

Even in this case, the same advantageous effects as those in the aforementioned embodiments can be obtained by providing the current limitation device 6 as shown in FIG. 19.

Figure 20:
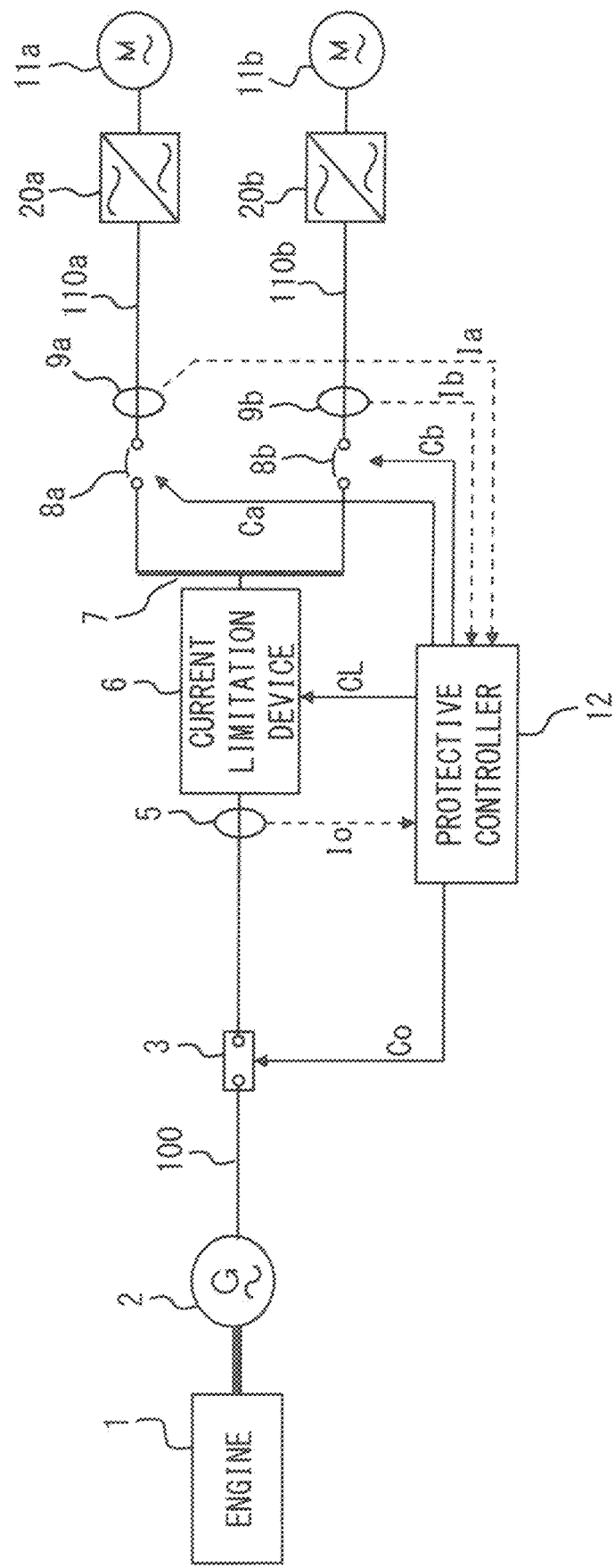
FIG. 20 illustrates an example of the configuration of the power distribution system for a moving body according to embodiment 8.

It is noted that AC/AC converters (inverters) 20a and 20b for controlling the propulsion motors 11a and 11b may be provided on the load lines 110a and 110b as shown in FIG. 20.

As described above, the present embodiment achieves applicability also to a case where only AC lines are used as the power lines.

Figure 21:
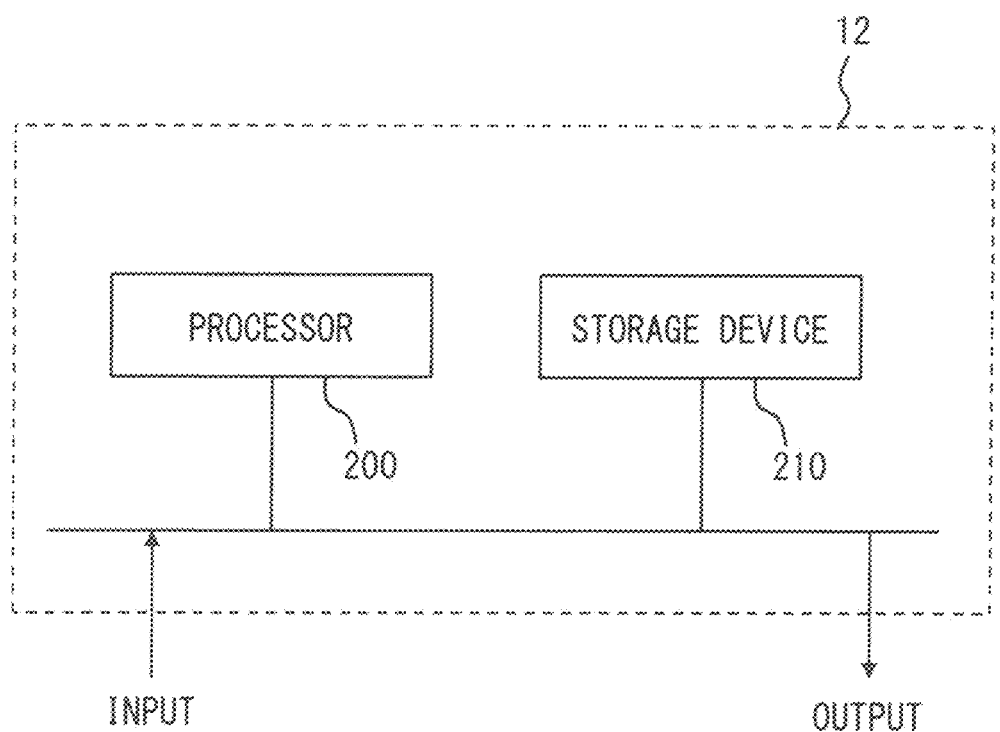
FIG. 21 illustrates an example of the hardware configuration of a protective controller in each of the embodiments of the present disclosure.

It is noted that the protective controller 12 described in each of the aforementioned embodiments is composed of a processor 200 and a storage device 210, an example of hardware of the protective controller 12 being shown in FIG. 21. Although not shown, the storage device includes a volatile storage device such as a random access memory and a nonvolatile auxiliary storage device such as a flash memory.

Alternatively, the storage device may include, as the auxiliary storage device, a hard disk instead of a flash memory. The processor 200 executes a program inputted from the storage device 210. In this case, the program is inputted from the auxiliary storage device via the volatile storage device to the processor 200. Further, the processor 200 may output data such as a computation result to the volatile storage device of the storage device 210 or may save the data via the volatile storage device into the auxiliary storage device.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 engine
2 power generator

3 AC circuit breaker
4 AC/DC converter
5, 9a, 9b current detector
6 current limitation device
7 busbar
8a, 8b opening/closing device
10a, 10b DC/AC converter
11a, 11b propulsion motor
12 protective controller
21 semiconductor switch
22 current limitation element
51 mechanical switch
71 DC reactor
62 grounding device
100 main line
110a, 110b load line

The invention claimed is:

1. A power distribution system for a moving body, the power distribution system comprising:
a power generator driven by an engine used for the moving body; and
a power line through which power generated by the power generator is transmitted to a load, wherein
the power line between the power generator and the load is provided with
a current limitation device configured to, when detecting occurrence of a fault current, limit the fault current, the current limitation devise being at least partially enclosed in a sealed container and operating even under an atmospheric pressure at a high altitude lower than the atmospheric pressure on the ground, and
a current interruption device configured to interrupt current heading for the load, in conjunction with the limitation of the fault current performed by the current limitation device.

2. The power distribution system for a moving body according to claim 1, the power distribution system further comprising:
a current detector on the power line; and
a protective controller configured to detect occurrence of the fault current on the basis of a current detection value from the current detector,
transmit, to the current limitation device, an operation command to limit the fault current, and
transmit, when the fault current is limited, an interruption command to the current interruption device.

3. The power distribution system for a moving body according to claim 2, wherein the protective controller is set to have a function of giving an output adjustment command to the power generator when detecting occurrence of the fault current.

4. The power distribution system for a moving body according to claim 3, wherein the power generator adjusts, on the basis of the output adjustment command, an output amount of the power generator according to a fluctuation amount of the load.

5. The power distribution system for a moving body according to claim 1, wherein
each of the current limitation device and the current interruption device is set to have a function of detecting occurrence of the fault current, and,
when the fault current occurs, the current limitation device limits the fault current, and then the current interruption device disconnects the power line.

6. The power distribution system for a moving body according to claim 1, wherein the current limitation device has a configuration in which at least one semiconductor switch and at least one current limitation element are connected in parallel.

7. The power distribution system for a moving body according to claim 6, wherein a resistor or an arrester is used as the current limitation element.

8. The power distribution system for a moving body according to claim 6, wherein, in a case of providing the current limitation device on an AC line, a current limitation element obtained by connecting a resistor and an inductance element is used as the current limitation element.

9. The power distribution system for a moving body according to claim 1, wherein the current limitation device has a configuration in which a mechanical switch, a semiconductor switch, and a current limitation element are connected in parallel.

10. The power distribution system for a moving body according to claim 9, wherein
in a normal case, current is conducted through the mechanical switch, and,
upon occurrence of the fault current, current is transferred from the mechanical switch to the semiconductor switch first, and then current is transferred from the semiconductor switch to the current limitation element.

11. The power distribution system for a moving body according to claim 1, wherein a DC reactor is connected on the power generator side relative to the current limitation device.

12. The power distribution system for a moving body according to claim 1, wherein a grounding device is provided on the load side relative to the current limitation device.

13. The power distribution system for a moving body according to claim 1, wherein an opening/closing device is provided as the current interruption device.

14. The power distribution system for a moving body according to claim 1, wherein
the power line includes
a main line connected to the power generator, and
a plurality of load lines having branched off from the main line and connected to the loads,
the main line is provided with the current limitation device and the current interruption device, and
the load lines are provided with the respective current interruption devices.

15. The power distribution system for a moving body according to claim 14, wherein
the power generator is an AC power generator,
an AC/DC converter is connected to the main line,
a DC/AC converter is connected to each load line, and
each of the AC/DC converter and the DC/AC converter serves as the current interruption device.

16. The power distribution system for a moving body according to claim 1, wherein
the power line includes
a main line connected to the power generator, and
a plurality of load lines having branched off from the main line and connected to the loads,
the main line is provided with the current interruption device, and
the load lines are provided with the respective current limitation devices and the respective current interruption devices.

17. A power distribution system for a moving body, the power distribution system comprising:
a power generator; and a power line through which power generated by the power generator is transmitted to a load, wherein the power line between the power generator and the load is provided with a current limitation device configured to, when detecting occurrence of a fault current, limit the fault current, a current interruption device configured to interrupt current heading for the load, in conjunction with the limitation of the fault current performed by the current limitation device, a current detector on the power line; and a protective controller configured to detect occurrence of the fault current on the basis of a current detection value from the current detector, transmit, to the current limitation device, an operation command to limit the fault current, and transmit, when the fault current is limited, an interruption command to the current interruption device, wherein the protective controller is set to have a function of giving an output adjustment command to the power generator when detecting occurrence of the fault current.

18. The power distribution system for a moving body according to claim 17, wherein the power generator adjusts, on the basis of the output adjustment command, an output amount of the power generator according to a fluctuation amount of the load.

19. A power distribution system for a moving body, the power distribution system comprising:

a power generator; and a power line through which power generated by the power generator is transmitted to a load, wherein the power line between the power generator and the load is provided with a current limitation device configured to, when detecting occurrence of a fault current, limit the fault current, a current interruption device configured to interrupt current heading for the load, in conjunction with the limitation of the fault current performed by the current limitation device, wherein a DC reactor is connected on the power generator side relative to the current limitation device.

20. The power distribution system for a moving body according to claim 19, the power distribution system further comprising:

a current detector on the power line; and a protective controller configured to detect occurrence of the fault current on the basis of a current detection value from the current detector, transmit, to the current limitation device, an operation command to limit the fault current, and transmit, when the fault current is limited, an interruption command to the current interruption device.

\* \* \* \* \*